(12) United States Patent
Askar et al.

(10) Patent No.: US 10,291,384 B2
(45) Date of Patent: May 14, 2019

(54) TRANSCEIVER AND METHOD FOR REDUCING A SELF-INTERFERENCE OF A TRANSCEIVER

(71) Applicant: Fraunhofer-Gesellschaft zur Foerderung der angewandten Forschung e.V., Munich (DE)

(72) Inventors: Ramez Askar, Berlin (DE); Benjamin Schubert, Berlin (DE); Wilhelm Keusgen, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/868,728

(22) Filed: Jan. 11, 2018

(65) Prior Publication Data

US 2018/0131502 A1    May 10, 2018

Related U.S. Application Data

(63) Continuation of application No. PCT/EP2015/066206, filed on Jul. 15, 2015.

(51) Int. Cl.
*H04B 7/005* (2006.01)
*H04L 5/14* (2006.01)
(Continued)

(52) U.S. Cl.
CPC ......... *H04L 5/1461* (2013.01); *H04B 1/1027* (2013.01); *H04B 1/123* (2013.01);
(Continued)

(58) Field of Classification Search
None
See application file for complete search history.

(56) References Cited

U.S. PATENT DOCUMENTS

| 2009/0185510 A1* | 7/2009 | Elahi | H04B 17/10 370/277 |
| 2009/0186582 A1* | 7/2009 | Muhammad | H04B 1/525 455/63.1 |

(Continued)

FOREIGN PATENT DOCUMENTS

| JP | 2003500876 A | 1/2003 |
| JP | 2007318690 A | 12/2007 |

(Continued)

OTHER PUBLICATIONS

Baharadia, Dinesh et al., "Full Duplex Radios", Proceedings of the ACM SIGCOMM 2013 conference on SIGCOMM, ser. SIGCOMM '13, 2013, pp. 375-386.

(Continued)

*Primary Examiner* — Phirin Sam
(74) *Attorney, Agent, or Firm* — Perkins Coie LLP; Michael A. Glenn

(57) ABSTRACT

A transceiver includes an antenna arrangement configured for interfacing a wireless transmission channel and including an interface for receiving a sending signal and an interface for providing a receiving signal. The transceiver includes a main transmitter, an analog domain filter, an auxiliary transmitter, a radio frequency interference removal stage, a main receiver, a feedback receiver and a processor configured performing digital signal operations. The transceiver is configured for performing interference cancellation on a receiving signal in a radio frequency domain and in a digital domain.

32 Claims, 9 Drawing Sheets

(51) Int. Cl.
*H04B 1/10* (2006.01)
*H04B 1/12* (2006.01)
*H04B 1/401* (2015.01)
*H04B 1/44* (2006.01)
*H04B 1/3827* (2015.01)

(52) U.S. Cl.
CPC .............. *H04B 1/401* (2013.01); *H04B 1/44* (2013.01); *H04B 2001/3855* (2013.01)

(56) References Cited

U.S. PATENT DOCUMENTS

| | | | |
|---|---|---|---|
| 2013/0155913 A1 | 6/2013 | Sarca | |
| 2014/0036736 A1* | 2/2014 | Wyville | H04B 1/109 370/278 |
| 2014/0101423 A1 | 4/2014 | Kubo | |
| 2015/0049834 A1 | 2/2015 | Choi et al. | |
| 2017/0207812 A1* | 7/2017 | Wyville | H04L 5/14 |

FOREIGN PATENT DOCUMENTS

| | | |
|---|---|---|
| JP | 2008193323 A | 8/2008 |
| JP | 2010507337 A | 3/2010 |
| JP | 2013110510 A | 6/2013 |
| JP | 2013150292 A | 8/2013 |
| WO | 2012106263 A1 | 8/2012 |
| WO | 2014097267 A1 | 6/2014 |

OTHER PUBLICATIONS

Bharadia, Dinesh et al., "Full Duplex MIMO Radios", 11th USENIX Symposium on Networked Systems Design and Implementation (NSDI I4), Apr. 2013, pp. 359-372.
Choi, Jung I. et al., "Achieving Single Channel, Full Duplex Wireless Communication", Proceedings of the sixteenth annual international conference on Mobile computing and networking, ser. MobiCom '10., 2010, pp. 1-12.
Everett, Evan et al., "Empowering Full-Duplex Wireless Communication by Exploiting Directional Diversity", Signals, Systems and Computers (ASILOMAR), 2011 Conference Record of the Forty Fifth Asilomar Conference., Nov. 2011, pp. 2002-2006.
Everett, Evan et al., "Passive Self-Interference Suppression for Full-Duplex Infrastructure Nodes", Wireless Communications, IEEE Transactions on, vol. PP, No. 99., 2014, pp. 1-15.
Sahai, Achaleshwar et al., "Pushing the limits of Full-duplex: Design and Real-time Implementation", Rice University, Technical report, Jul. 2011.
Askal, Ramez et al., "Active Self-interference Cancellation Mechanism for Full-Duplex Wireless Transceivers", Cognitive Radio Oriented Wireless Networks and Communications (CROWNCOM), 2014 9th International Conference, Jun. 2014, pp. 539-544.
Askar, Ramez et al., "I/Q Imbalance Calibration for Higher Self-Interference Cancellation Levels in Full-Duplex Wireless Transceivers", 5G for ubiquitous Connectivity (5GU), 2014 1st International Conference, Nov. 2014, pp. 92-97.
Bharadia, Dinesh et al., "Full duplex backscatter", Proceedings of the Twelfth ACM Workshop on HotTopics in Networks, ser. HotNets-XII, 2013, pp. 4:1-4:7.
Duarte, Melissa et al., "Experiment-Driven Characterization of Full-Duplex Wireless Systems", Wireless Communications, IEEE Transactions on, vol. 1 1, No. 12, Dec. 2012, pp. 4296-4307.
Duarte, Melissa et al., "Full-Duplex Wireless Communications Using Off-the-Shelf Radios: Feasibility and First Results", Signals, Systems and Computers (ASILOMAR), 2010 Conference Record of the Forty Fourth Asilomar Conference, 2010, pp. 1558-1562.
Hua, Yingbo et al., "Breaking the barrier of transmission noise in full-duplex radio", Military Communications Conference, MILCOM 2013—2013 IEEE, Nov. 2013, pp. 1558-1563.
Jain, Mayank et al., "Practical Real-Time, Full Duplex Wireless", Proceedings of the 17th annual international conference on Mobile computing and networking, ser. MobiCom '11, 2011, pp. 301-312.
Khojastepour, Mohammad A. et al., "The Case for antenna Cancellation for Scalable Full-Duplex Wireless Communications", Proceedings of the '10th ACM Workshop on Hot Topics in Networks, ser. HotNets-X, 2011, pp. 17:1-17:6.
Kim, J. et al., "Digital predistortion of wideband signals based on power amplifier model with memory", Electronics Letters, 2001, pp. 1417-1418.
Radunovic, Bozidar et al., "Rethinking indoor wireless: Low powe4 low frequency, full-duplex", Microsoft Research, Technical report MSR-TR-2009-148, 2009.
Sahai, Achaleshwar et al., "On the impact of phase noise on active cancellation in wireless full-duplex", Vehicular Technology, IEEE Transactions on, vol. 62, No. 9, Nov. 2013, pp. 4494-4510.
Syrjala, Ville et al., "Analysis of oscillator phase-noise effects on self-interference cancellation in full-duplex ofdm radio transceivers", Wireless Communications, IEEE Transactions on, vol. 13, No. 6, Jun. 2014, pp. 2977-2990.
Zhu, Anding et al., "An Overview of Volterra Series Based Behavioral Modeling of RF/Microwave Power Amplifiers", Wireless and Microwave Technology Conference, 2006. WAMICON '06. IEEE Annual, 2006, pp. 1-5.

* cited by examiner

TRANSCEIVER AND METHOD FOR REDUCING A SELF-INTERFERENCE OF A TRANSCEIVER

CROSS-REFERENCE TO RELATED APPLICATIONS

This application is a continuation of copending International Application No. PCT/EP2015/066206, filed Jul. 15, 2015, which is incorporated herein by reference in its entirety.

BACKGROUND OF THE INVENTION

The present invention relates to a transceiver for wirelessly accessing a transmission channel, to a system comprising such a transceiver and to a method for reducing a self-interference of a transceiver. The present invention further relates to an agile full-duplex wireless transceiver.

The full-duplex wireless communication scheme—or the in-band full-duplex as it has been described in some of the published literature—has been recently drawn much of attention by the academia and industry as a replacement of the currently deployed half-duplex wireless communication systems. The full-duplex systems are targeting a complete reuse of the utilized frequency band in order to exploit the limited spectrum resources more efficiently. The two full-duplex nodes, for example in a point to point scenario, will communicate over the same frequency band and without any time discontinuity. That is how the full-duplex wireless communication system is supposed to work, therefore, it will interfere itself by its own transmission signal which it is called in the literature the self-interference signal. Among wireless communication researchers, there is a broad consensus that the self-interference cancellation is the key enabling methodology for the full-duplex scheme. The realization of the self-interference cancellation has been visited in the literature in many techniques and transceiver architectures. The diversity of the proposed techniques and transceiver architecture alterations were nonetheless not able to entirely satisfy the greedy needs of the self-interference cancellation requirements.

In spite of the fact that couple of the experimental testbeds has demonstrated almost perfect self-interference cancellation levels [1,2], they were impractical for real-world implementation and serve only academic purposes to proof the concept. The lack of having a fully operational full-duplex transceiver architecture with an appropriate self-interference cancellation mechanism motivates this patent application. None of the accomplished work up so far has offered a practical concept of a full-duplex wireless transceiver. The invention that is going to be described throughout the rest of this document, crystalizes the architecture of a futuristic agile full-duplex wireless transceiver and the successive self-interference cancellation algorithm that should run over it. Several alternatives of the agile full-duplex transceiver are going to be covered within multiple embodiments which are enabled by the successive self-interference cancellation mechanism.

Many techniques have been discussed in the published literature concerning the full-duplex topic. Additionally, some transceiver solutions have been proposed in patent applications [3,4]. All these techniques have attempted to cancel the self-interference as an essential step towards enabling full-duplex systems. In spite of the fact that all these techniques share a common objective of canceling the self-interference, they have practically been realized in many different ways. A concatenation of several techniques to construct a whole robust mechanism of self-interference cancellation was however used in most of the published work.

The radio frequency (RF) domain self-interference cancellation is compulsory in any full-duplex system. Additionally, the digital cancellation was implemented in most of the self-interference cancellation mechanisms to suppress the self-interference furthermore. A tree chart categorizing the self-interference cancellation techniques that have been covered in the state-of-the-art is shown in FIG. 9. The cancellation techniques can be divided into two main categories: Cancellation at the RF domain and digital cancellation applied to the digitized samples. The RF cancellation techniques have been done either passively by attenuating the self-interference signal or actively by adding a self-interference cancellation signal to the RF interference signal (the signal-injection approaches as it called in the tree diagram in FIG. 9).

The RF attenuation cancellation techniques have been investigated in the literature [5,6,7]. These techniques rely basically on the direction of the antennas with combination of some other methods, such as antennas physical separation, dual polarization or RF absorbing materials. These techniques have experimentally demonstrated good passive cancellation results for the line-of-sight (LoS), whereas they were vulnerable against the rest of multipath wireless channel components. One main drawback of these canceling techniques, though, is that the uplink and downlink of the full-duplex node don't occupy the same spatial domain. Instead, they are directed towards two different locations. This makes such technique not applicable in point-to-point scenarios where both communication nodes are operating in full-duplex mode.

The signal-injection self-interference cancellation has diverse approaches based on how the self-interference signal is generated. For instance the work in [8,9] and [10] has proposed a self-interference cancellation technique based on a conditional placement of an antenna-set. This cancellation technique involves two transmitting antennas spaced apart from the receiving antenna by distances d and $(d+\lambda/2)$ respectively. In that way the two transmitting antennas cause a null by superposition at the receiving antenna location. This mechanism suffers from many practical and performance limitations. One of these limitations is the placement calibration among antennas, which should be very accurate to ensure that the signal, which is impinging at the receiving antenna from the second transmitting antenna, is phase shifted by 180° degrees exactly. Even under the assumption that the calibration process is physically possible, this technique provides suppression of the self-interference signal at the center frequency. The suppression value is dramatically reduced when the frequency drifts away from the center frequency. As expected and proved by experiments, this cancellation technique works well only for narrowband systems.

Further work in [11] attempted to overcome the aforementioned drawback of the self-interference cancellation in [8] and additionally to reduce the number of the antennas that may be used. Authors in [11] have introduced an element to the full-duplex system design which is the RF Balun. By integrating the RF Balun into the full-duplex transceiver body, a negative version of the self-interference signal has been produced. With the aid of a noise canceling chip, the attenuation and delay that may be used were applied to the cancellation signal. The results of the RF Balun implementation are much better than the earlier work with antenna placement, particularly in broadening the self-interference cancellation bandwidth. Although, this approach still falls short of the self-interference cancellation requirements even with a consecutive stage of digital self-interference cancellation. Moreover, this approach has practical limitations such as the additional nonlinearities that the noise canceling chip introduces to cancellation signal and the RF Balun imperfections, such as leakage and frequency unflatness.

A totally different cancellation technique has been proposed by the scientists at Rice University [7,12,13]. This technique has been characterized in the literature as active cancellation technique—categorized here under the signal-injection with auxiliary transmission chain approach—due to its mechanism in which the full-duplex transceiver involves an additional transmission chain. The auxiliary transmission chain self-interference cancellation approach provides an appropriate room in the digital domain to implement and test several sophisticated digital signal processing algorithms in which the multipath self-interference wireless channel is considered in the waveform of the self-interference cancellation signal [14,15]. In spite of the flexibility which this cancellation technique has established by including the self-interference wireless channel in its multipath general model, this technique has some harmful consequences on the self-interference cancellation mechanism. Some of these consequences have been studied earlier in the literature. As a matter of fact, some of them have been characterized as the bottleneck in the active cancellation mechanism. The phase noise of the local oscillator is one of these effects which are limiting the performance of the auxiliary transmission chain cancellation approach [16,17], even though the same local oscillator is used for both transmitting chains. Another effect, which is usually neglected in the half-duplex systems, is the transmitter-generated noise [18]. Normally, in the conventional half-duplex system the receiver is located remotely at the other side of the communication. In contrast for the self-interference case in the full-duplex system, the receiver of the self-interference is located at the full-duplex node. Therefore the transmitter noise level will not lie below the noise floor of the receiver like in the case of half-duplex systems.

Recently, some extensible work from researchers at Stanford university has demonstrated promising results in the full-duplex communication systems [1,2,19]. These results have shown that in some scenarios the full-duplex systems have the potential to achieve a spectral efficiency as double as the half-duplex systems. This cancellation technique is based on printed circuit board (PCB) with multiple routes, having a different length in order to provide several delays. These multiple routes are supported with adjustable attenuators. The entire design is used to imitate the circulator leakage and the antenna mismatch reflection. This technique with a concatenating stage of digital self-interference cancellation is able to suppress the self-interference almost to the receiver noise floor. Many other considerations should be taken into account in the commodity wireless hardware such as having relatively nearby obstacles around the full-duplex node or having a compact transceiver design accommodating inside the full-duplex device. Additionally, the complicated structure of the transceiver as the system scaled up into MIMO configuration due to the RF circulator limitation, and the large number of PCB boards that may be used [2].

The digital self-interference cancellation may be used to suppress the residual self-interference further more. The diversification of the digital cancellation approach has come after the transmitter-generated noise limiting factor had been discovered. The solution with aids of additional receiving chain has been introduced to the literature in [18]. The auxiliary receiving chain has been employed to down-convert and digitize the self-interference signal, which is used to suppress the self-interference signal in the digital domain. Such technique outperforms the pure digital one, which relies on the digital baseband samples, by having a digital cancellation signal mixed with transmitter-generated noise.

In any two-way wireless transceiver, the transmission chain generates the RF signal to be transmitted wirelessly to the other node of the communication link. Meanwhile, the same node has to listen to the other side of the wireless communication link in order to receive the desired remote signal. The active transmission signal would interfere the reception of the remote signal and prevent the transceiver from receiving when it's actively transmitting. This problem has been solved so far by one of the duplexing schemes, which utilizes either two neighboring frequency bands or different time slots. These conventional schemes—frequency division duplexing (FDD) or time domain duplexing (TDD)—waste the limited frequency-time resources, therefore, the idea of having a system utilizes the time resources continuously and over the same frequency band is proposed recently [20]. This scheme of wireless duplexing is called the full-duplex or in-band full-duplex, not to be confused with the generic term of two-way type of communicating. In the in-band full-duplex, the communicating nodes transmit and receive over the same frequency band and they are simultaneously active all the time, of course when it's needed. Such duplexing scheme is supposed to offer the best utilization manner of the frequency time resources so far however, it's not easy to be practically realized.

In practice, the transmission chain in a full-duplex transceiver generates the RF transmission signal which is supposed to be received by the remote communication node. Unlike in the FDD transceivers where this transmission signal would be suppressed by means of RF duplexing filters, this signal is entirely received by the transceiver itself and interferes the reception in the local transceiver. This interference signal is called the self-interference signal, which is the main obstacle that have to be tackled in order to practically realize the full-duplex scheme. The desired reception signal is vastly attenuated due to the long travelling distance in the wireless medium, whereas the self-interference is locally generated and therefore is really less attenuated than the remote signal. Hence, the self-interference signal prevents the transceiver from receiving the remote desired signal due to its overwhelming magnitude.

Accordingly, the self-interference signal has to be sufficiently suppressed in order to be able to receive the remote desired signal. The amount of suppression that may be used is high, which might be not possible to be suppressed by a simple cancellation technique, especially when a compact transceiver specification has to be maintained. Another technical problem that the currently-deployed FDD wireless transceivers suffers from, which is the out-of-band emissions. These emissions are unwanted, and they spill from the transmission frequency band over the receiving one—up-link to down-link or the other way around depending on the node type, user terminal or base station. This stresses the design constrains of the diplexer filters in order to meet a highly attenuation factors for the out-of-band emissions. Additionally, it imposes the need of placing a duplexing gap between the up-link and the down-link frequency bands.

Thus, there is a need for an enhancement of wireless communications.

SUMMARY

According to an embodiment, a transceiver may have: an antenna arrangement configured for interfacing a wireless transmission channel and having an interface for receiving a sending signal and an interface for providing a receiving signal; a main transmitter connected to the antenna arrangement and configured for generating the sending signal based on a digital transmission signal; an analog domain filter configured for generating a first interference cancellation signal from the sending signal; an auxiliary transmitter configured for generating a second interference cancellation signal based on a digital auxiliary signal; a radio frequency interference removal stage for performing interference cancellation on the receiving signal using the first interference cancellation signal and the second interference cancellation signal to obtain a preliminary enhanced signal; a main receiver configured for receiving the preliminary enhanced signal and for providing a digital receiving signal; a feedback receiver configured for providing a feedback signal based on the preliminary enhanced signal at a first operating mode and based on the sending signal at a second operating mode; and a processor configured for receiving the digital receiving signal, for receiving the feedback signal, for providing the digital transmission signal based on an input information signal and for providing the digital auxiliary signal based on the input information signal; wherein the processor has a linear pre-equalizer configured for pre-equalizing the digital auxiliary signal based on the digital receiving signal; wherein the processor has a digital self-interference canceller configured for determining a digital interference cancellation signal based on the input signal and based on the digital receiving signal; wherein the processor has a digital interference removal stage configured for performing digital interference cancellation on the digital receiving signal using the digital interference cancellation signal to obtain an enhanced receiving signal; and wherein the processor is configured for parametrizing the analog domain filter based on an evaluation of the feedback signal received from the feedback receiver in the first operating mode and in the second operating mode and for parametrizing the linear pre-equalizer based on the digital receiving signal.

According to another embodiment, a system may have: an inventive transceiver; and a data source for providing the input signal.

According to another embodiment, a method for reducing a self-interference of a transmitter may have the steps of: interfacing a wireless transmission channel with an antenna arrangement; generating a sending signal based on a digital transmission signal using a main transmitter; generating a first interference cancellation signal from the sending signal using an analog domain filter; generating a second interference cancellation signal based on a digital auxiliary signal using an auxiliary transmitter; performing, using an interference removal stage, radio frequency interference cancellation on the receiving signal using the first interference cancellation signal and the second interference cancellation signal to obtain a preliminary enhanced signal; receiving the preliminary enhanced signal and providing a digital receiving signal using a main receiver; providing a feedback signal based on the preliminary enhanced signal at a first operating mode and based on the sending signal at a second operating mode using a feedback receiver; receiving the feedback signal, providing the digital transmission signal based on an input information signal and providing the digital auxiliary signal based on the input information signal using a processor; and pre-equalizing the digital auxiliary signal based on the digital receiving signal using a linear pre-equalizer; determining a digital interference cancellation signal based on the input signal and based on the digital receiving signal using a digital self-interference canceller of the processor; performing digital interference cancellation on the digital receiving signal using the digital interference cancellation signal and using a digital interference removal stage of the processor to obtain an enhanced receiving signal; parametrizing the analog domain filter based on an evaluation of the feedback signal received from the feedback receiver in the first operating mode and in the second operating mode and parametrizing the linear pre-equalizer based on the digital receiving signal using the processor.

Another embodiment may have a non-transitory digital storage medium having a computer program stored thereon to perform the method for reducing a self-interference of a transmitter, the method having the steps of: interfacing a wireless transmission channel with an antenna arrangement; generating a sending signal based on a digital transmission signal using a main transmitter; generating a first interference cancellation signal from the sending signal using an analog domain filter; generating a second interference cancellation signal based on a digital auxiliary signal using an auxiliary transmitter; performing, using an interference removal stage, radio frequency interference cancellation on the receiving signal using the first interference cancellation signal and the second interference cancellation signal to obtain a preliminary enhanced signal; receiving the preliminary enhanced signal and providing a digital receiving signal using a main receiver; providing a feedback signal based on the preliminary enhanced signal at a first operating mode and based on the sending signal at a second operating mode using a feedback receiver; receiving the feedback signal, providing the digital transmission signal based on an input information signal and providing the digital auxiliary signal based on the input information signal using a processor; and pre-equalizing the digital auxiliary signal based on the digital receiving signal using a linear pre-equalizer; determining a digital interference cancellation signal based on the input signal and based on the digital receiving signal using a digital self-interference canceller of the processor; performing digital interference cancellation on the digital receiving signal using the digital interference cancellation signal and using a digital interference removal stage of the processor to obtain an enhanced receiving signal; parametrizing the analog domain filter based on an evaluation of the feedback signal received from the feedback receiver in the first operating mode and in the second operating mode and parametrizing the linear pre-equalizer based on the digital receiving signal using the processor, when said computer program is run by a computer.

The present invention is based on the finding that by sequentially performing a self-interference cancellation in an analog or radio frequency (RF) domain and in a digital domain, a self-interference suppression or cancellation may be achieved which allows for low or even vanishingly low interference levels. The low self-interference levels may allow for exploiting wireless resources such as frequency and time efficiency at a high level as a low amount or even none of frequency and/or time gaps have to be provided. I.e., an in-band full duplex operation of the transceiver may be achieved. Alternatively or in addition, by reducing or canceling the self-interference, received wireless signals may be decoded even when comprising a very low magnitude due to a travel of the received wireless signal over a large distance. Thus, by reducing the self-interference level, a range of communication may be increased as a received wireless signal may be decoded without being interfered with local signal at the receiver side.

An embodiment of the present invention provides a transceiver comprising an antenna arrangement configured for interfacing a wireless transmission channel and comprising an interface for receiving a sending signal and an interface for providing a receiving signal. The transceiver comprises a main transmitter connected to the antenna arrangement and configured for generating the sending signal based on a digital transmission signal. The transceiver comprises an analog domain filter configured for generating a first interference cancellation signal from the sending signal. The transceiver comprises an auxiliary transmitter configured for generating a second interference cancellation signal based on a digital auxiliary signal. The transceiver further comprises a radio frequency interference removal stage for performing interference cancellation on the receiving signal using the first interference cancellation signal and the second interference cancellation signal to obtain a preliminary enhanced signal. A main receiver of the transceiver is configured for receiving the preliminary enhanced signal and for providing a digital receiving signal. A feedback receiver of the transceiver is configured for providing a feedback signal based on the preliminary enhanced signal at a first operating mode and based on the sending signal at a second operating mode. The transceiver comprises a processor configured for receiving the feedback signal, for providing the digital transmission signal based on an input information signal and for providing the auxiliary digital signal based on the input information signal. The processor comprises a linear pre-equalizer configured for pre-equalizing the digital auxiliary signal based on the digital receiving signal. The processor further comprises a digital self-interference canceller configured for determining a digital interference cancellation signal based on the input signal and based on the digital receiving signal. The processor further comprises a digital interference removal stage configured for performing digital interference cancellation on the digital receiving signal using the digital interference cancellation signal to obtain an enhanced receiving signal. The processor is configured for parametrizing the analog domain filter based on an evaluation of the feedback signal received from the feedback receiver in the first operating mode and in the second operating mode and for parametrizing the linear pre-equalizer based on the digital receiving signal. By performing self-interference cancellation in the radio frequency domain and in the digital domain, a self-interference level may be obtained being lower or vanishingly low.

Further embodiments provide a method for reducing a self-interference of a transceiver. The method comprises interfacing a wireless transmission channel with an antenna arrangement and generating a sending signal based on a digital transmission signal using a main transmitter. The method comprises generating a first interference cancellation signal from the sending signal using an analog domain filter and generating a second interference cancellation signal based on a digital auxiliary signal using an auxiliary transmitter. The method comprises performing, using an interference removal stage, radio frequency interference cancellation on the receiving signal using the first interference cancellation signal and the second interference cancellation signal to obtain a preliminary enhanced signal. The method comprises receiving the preliminary enhanced signal and providing a digital receiving signal using a main receiver. A feedback signal is provided based on the preliminary enhanced signal using a feedback transceiver at a first operating mode and based on the sending signal at a second operating mode of the feedback transceiver. The method comprises receiving the feedback signal, providing the digital transmission signal based on an input information signal and providing the auxiliary digital signal based on the input information signal using a processor. The digital auxiliary signal is pre-equalized based on the digital receiving signal using a linear pre-equalizer. A digital interference cancellation signal is determined based on the input signal and based on the digital receiving signal using a digital self-interference canceller of the processor. A digital interference cancellation is performed on the digital receiving signal using the digital interference cancellation signal and using a digital interference removal stage of the processor to obtain an enhanced receiving signal. The analog domain filter is parametrized based on an evaluation of the feedback signal received from the feedback receiver in the first operation mode and in the second operating mode and parametrizing the linear pre-equalizer based on the digital receiving signal using the processor.

Further embodiments relate to a system comprising a transceiver and to a computer program.

BRIEF DESCRIPTION OF THE DRAWINGS

Embodiments of the present invention will be detailed subsequently referring to the appended drawings, in which.

Figure 1:
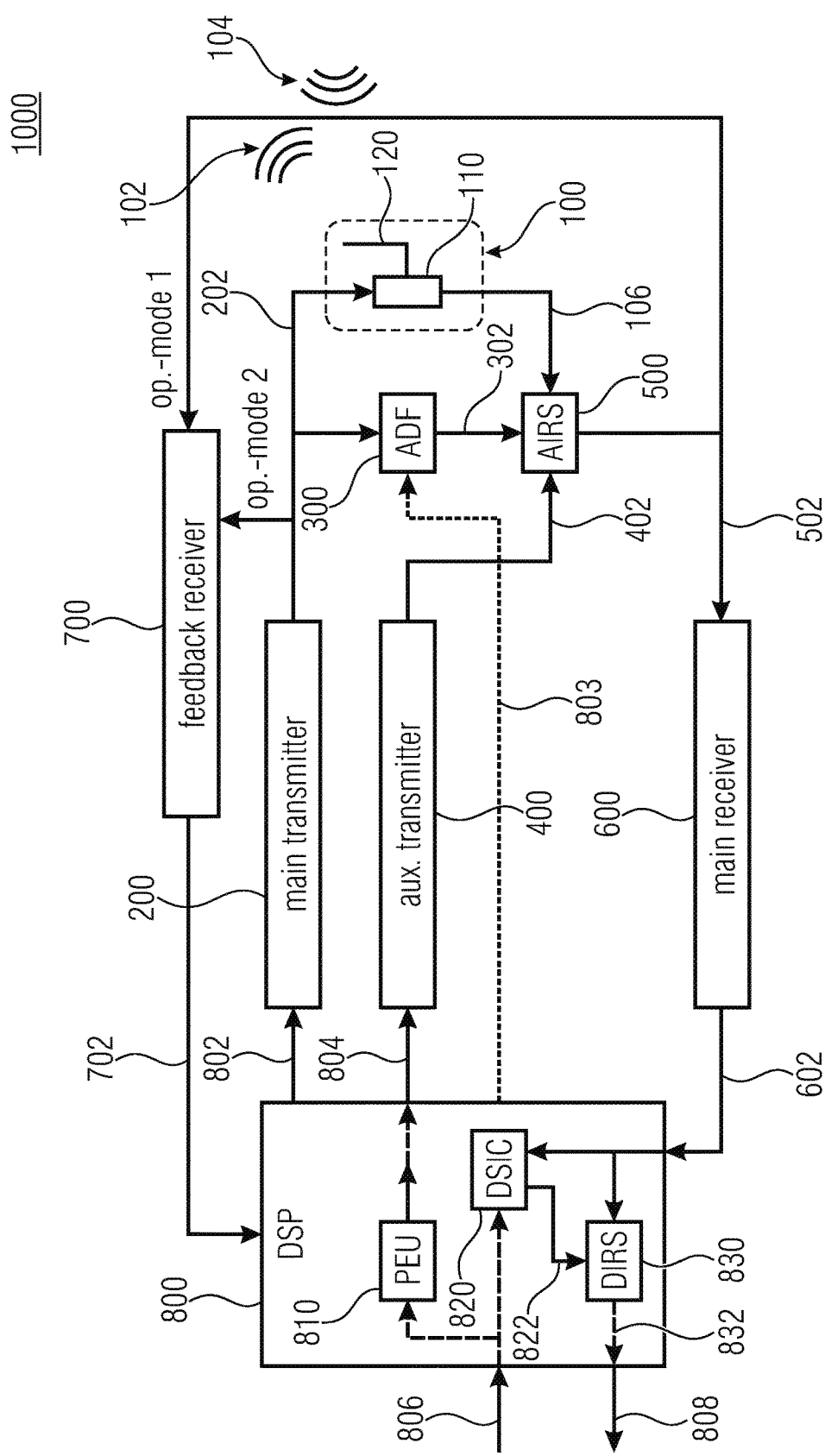
FIG. 1 shows a schematic block diagram of a transceiver according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following description, reference will be made to self-interference of a transceiver and to concepts for reducing or suppressing a self-interference of the transceiver. A transceiver may be understood as an apparatus configured for transmitting and receiving with at least one other receiver and/or sender.

Self-interference may be understood as an interference effect of a first signal processed, generated or received by or from the transceiver with respect to a second signal. For example, the transceiver may be configured for generating or sending a first signal (sending a signal) while receiving or processing a second signal, for example, a receiving signal. Superposition of both signals in an antenna arrangement or in circuitries (e.g., due to RF effects) may lead to a resulting signal comprising a portion of the sending signal and a portion of the receiving signal. As the local signal may be present with a higher signal power when compared to the receiving signal, reception may be impeded or prevented.

In the following description, reference will be made to pre-equalizing and to pre-distortion. Linear and non-linear distortions or properties of the transceiver, for example due to an up-conversion, a down-conversion, due to attenuation or delaying may be considered commonly (all together) or independently. For the sake of a better understanding, the following description will refer to pre-equalizers configured for modifying a signal to at least partially pre-compensate linear distortions of a signal. Pre-distorters will be referred to as pre-distorting a signal to at least partially compensate non-linear distortions of the later signal. Although the description may refer to a pre-equalizer and a pre-distorter arranged sequentially, both operations, pre-equalizing and pre-distortion, may be applied commonly by a common functionality. That is, a pre-equalizer may be configured for at least partially compensating linear distortions and may optionally be configured for at least partially compensating non-linear distortions. A pre-distorter may be configured for at least partially compensating non-linear distortions and may optionally be configured for at least partially compensating linear distortions.

Some of the details set forth below may refer to an adaption of components before the transceiver starts operation for exchanging information with other communication nodes, i.e., before communicating.

Transceivers described herein may utilize a subsequent adaption of parameters to first obtain a self-interference in a radio frequency domain and for reducing or eliminating a remaining self-interference in a digital domain. This may include for adapting RF components to at least partially reduce the self-interference in the RF domain and for determining digital signals based on a remaining self-interference not cancelled out in the RF domain.

FIG. 1 shows a schematic block diagram of a transceiver 1000 according to an embodiment. The transceiver 1000 comprises an antenna arrangement 100. The antenna arrangement 100 is configured for interfacing a wireless transmission channel. The antenna arrangement 100 comprises an interface 110 and an antenna element 120. The interface 110 may be, for example, a connector of the antenna element 120. The transceiver 1000 may be configured for wirelessly sending a wireless sending signal 102 and for wirelessly receiving a wireless receiving signal 104. The wireless receiving signal 104 may be received, for example, after adapting or determining at least a first and a second interference cancellation signal.

The transceiver 1000 comprises a main transmitter 200. The main transmitter may be configured for receiving a digital transmission signal 802 and for generating a sending signal 202 based on the digital transmission signal 802. Generating the sending signal 202 may comprise, for example, a transformation of the digital transmission signal 802 into an analog signal, for example, based on a digital-to-analog conversion and/or based on an up-conversion of the digital transmission signal 802. The antenna arrangement 100 may be configured for receiving the sending signal 202 at the interface 110 and for sending the wireless sending signal 102 based on the sending signal 202. The antenna arrangement 100 may be further configured for receiving the wireless receiving signal 104 and for providing a receiving signal 106 at the interface 110.

The transceiver 1000 comprises an analog domain filter (ADF) 300 configured for generating a first interference cancellation signal 302 from the sending signal 202, i.e. based on the sending signal 202. Generating the first interference cancellation signal 302 may comprise, for example, an attenuation, an inversion and/or a delay or phase shift of the sending signal 202. Generating the first interference cancellation signal 302 from the sending signal 202 using the analog domain filter 300 may comprise providing the sending signal 202 to the analog domain filter 300 and adapting a parameter of the variable phase/delay and attenuation network 320 based on an interference of the sending signal 202 determined at or for the preliminary enhanced signal 502, at a feedback signal 702 received from a feedback receiver 700, respectively.

The transceiver 1000 comprises an auxiliary transmitter 400 configured for generating a second interference cancellation signal 402 based on a digital auxiliary signal 804. As will be described later in more detail, a processor 800, for example a digital signal processor DSP, may be configured for providing the digital transmission signal 802 and the digital auxiliary signal 804. Alternatively, the processor 800 may be implemented, for example, so as to comprise a central processing unit (CPU), a field programmable gate array (FPGA) and/or a graphical processing unit (GPU).

Both signals, the digital transmission signal 802 and the digital auxiliary signal 804 may be provided based on an input information signal 806, comprising an information to be transmitted through the wireless transmission channel. The auxiliary transmitter 400 may comprise a structure and/or a functionality similar or equal to a functionality or structure of the main transmitter 200. Thus, the second interference cancellation signal 402 may at least indirectly relate to the sending signal 202 or be correlated to the sending signal 202 so as to provide an information related to an interference or distortion caused by transmitting the sending signal 202.

The transceiver 1000 comprises a radio frequency interference removal stage 500 which may also be referred to as analog interference removal stage (AIRS). The radio frequency interference removal stage 500 is configured for performing interference cancellation on the receiving signal 106 using the first interference cancellation signal 302 and based on the second interference cancellation signal 402 to obtain a preliminary enhanced signal 502. For example, the RF interference removal stage 500 may be configured for combining/superimposing the signals. The radio frequency interference removal stage may be connected to the antenna arrangement 100 for receiving the receiving signal 106, to the analog domain filter 300 for receiving the first interference cancellation signal 302 and to the auxiliary transmitter 400 for receiving the second interference cancellation signal 402. Optionally, other components may be arranged between the structures, for example filters for filtering the signals.

Simplified, the main transmitter 200 may be at least a part of a first transmission chain, wherein the auxiliary transmitter 400 may be at least a part of a second transmission chain. The second transmission chain may be used for at least partially compensating self-interference effects of the first transmission chain.

The radio frequency interference removal stage 500 may be configured for operating in the radio-frequency (RF) domain, i.e. in a domain being characterized by an analog signal and/or by a signal comprising a frequency (range) being related to the wireless transmission channel, i.e. different from a baseband frequency range.

The transceiver 1000 comprises a main receiver 600 configured for receiving the preliminary enhanced signal 502 and for providing a digital receiving signal 602 based on the preliminary enhanced signal 502. Providing the digital receiving signal 602 may comprise, for example, an analog-to-digital conversion and/or a down-conversion of the preliminary enhanced signal 502. Down-conversion may be understood as a transfer of a high-frequency or RF-frequency signal to a baseband signal, wherein up-conversion may be understood as a complementary operation.

The main receiver may be configured for receiving and processing the signal received from another communications node.

The transceiver 1000 comprises a feedback receiver 700 configured for providing a feedback signal 702 based on the preliminary enhanced signal 502 when operating at a first operating mode and based on the sending signal 202 when operating at a second operating mode. For example, the feedback receiver 700 may be configured for receiving a plurality of signals and for processing one of the them based on the operation mode. This may include to not process the other signals meanwhile. Simplified, the RF multiplexer 710 may be configured for receiving a plurality or multitude of signals and for forwarding one of the signal while not forwarding the other signals.

Basically, a functionality of the feedback receiver 700 may at least be similar to a functionality of the main receiver 600, wherein the feedback receiver 700 may be configured for receiving and processing different signals based on the operating mode of the feedback receiver 700. The main receiver 600 may be at least a part of a first receiving chain, wherein the feedback receiver 700 may be at least a part of a second receiving chain.

The transceiver 1000 comprises a processor 800, for example a digital a signal processor (DSP). The processor 800 may be configured for receiving the feedback signal 702 and the digital receiving signal 602. The processor 800 is further configured for providing the digital transmission signal 802 based on the input information signal 806 and for providing the auxiliary digital signal 804 based on the input information signal 806. Simplified, the processor 800 may be configured for receiving the input information signal (input signal) 806, to provide signals based thereon (transmitter functionality) and receive the wireless signal 104 and to provide the output signal 808 based thereon (receiver functionality).

In the following, details will be described referring to providing an output signal 808 based on the received wireless receiving signal 104, the output signal 808 comprising a low amount of interference caused by processing and/or transmitting the input information signal 806. The low amount of self-interference may allow for simultaneously sending the wireless sending signal 102 and receiving the wireless receiving signal 104 in at least partially overlapping frequency ranges and/or time slots, i.e. while transmitting in a so-called in-band full duplex mode. Although reference will be made to operation in the in-band full duplex mode, the transceiver 1000 may additionally be configured for operating in a time division duplex (TDD) and/or in a frequency division duplex (FDD). A reduced or low level of self-interference may allow for enhancement of operation in the TDD and/or in the FDD operation mode, for example, when reducing or canceling frequency gaps between a sending channel and a receiving channel and/or when reducing or canceling time gaps between both channels.

The processor 800 comprises a linear pre-equalizer (pre-equalizing unit PEU) 810 configured for pre-equalizing the digital auxiliary signal 804 based on the digital receiving signal 602. Simplified, by at least partially reducing or eliminating self-interference in the RF domain, the digital receiving signal 602 may comprise a residual self-interference. The processor 800 may be configured for determining a measure for the residual self-interference and may pre-equalize the auxiliary transmission signal 804 for pre-compensating or pre-modifying the second interference cancellation signal. For example, the processor 800 may be configured for determining a measure of correlation between the digital receiving signal 602 and the input information signal 806. The measure of correlation may indicate a level of the input information signal 806 (or signals derived thereof) influencing the digital receiving signal 602.

The measure of correlation may be transferred to parameters of pre-equalizing the input information signal 806 or a signal derived thereof for obtaining the auxiliary transmission signal 804.

The processor 800 comprises a digital self-interference canceler (DSIC) 820 configured for determining a digital interference cancellation signal 822 based on the input information signal 806 (including signals derived thereof) and based on the digital receiving signal 602. The processor 800 may be configured for determining parameters characterizing the signal interference and for determining signal operations, e.g., attenuation, superimposing with other signals or the like, for reducing the signal interference.

The processor 800 comprises a digital interference removal stage (DIRS) configured for performing digital interference cancellation on the digital receiving signal 602 using the digital interference cancellation signal 822 to obtain an enhanced receiving signal 832. The enhanced receiving signal 832 may be further processed or may be output by the processor 800 as output signal 808.

The processor 800 is configured for parametrizing the analog domain filter 300 based on an evaluation of the feedback signal 702 received from the feedback receiver 700 in the first operating mode and the second operation mode as will be described later in more detail. The processor is further configured for parametrizing the linear pre-equalizer 810 based on the digital receiving signal 602. The processor 800 may be configured for transmitting a control signal 803 to the analog domain filter 300 for adjusting at least one parameter of the analog domain filter 300.

The transceiver 1000 may be referred to as an agile full-duplex wireless transceiver. The agile full-duplex wireless transceiver may be configured to enable the (in-band) full-duplex wireless communication scheme when using the transceiver 1000. In addition, the transceiver 1000 may be configured to keep supporting or even enhancing the conventional duplexing schemes such as the frequency division duplex and/or the time divisional duplex scheme. The full-duplex wireless communication scheme may allow the communication nodes to communicate over the same frequency band and at the same time without any discontinuities caused by the communication scheme. The in-band full-duplex wireless communication scheme may allow for RF filter relaxation due to a partial or a complete overlap of an uplink band and a downlink band. Additionally and as will be described later on, the transceiver 1000 may comprise an agile tunability over a frequency range or over a large frequency range, i.e. a frequency of communication may be adapted to operate over a large frequency range. The strict attenuation requirements of filters used in FDD and/or TDD may be considerably relaxed by the aid of the self-interference cancellation capability of the agile full-duplex transceiver. Moreover, the duplexing gap in the FDD scheme can be mitigated as will be described with respect to FIG. 8. Additionally, the transceiver 1000 may be envisaged to support various frequency bands in order to reach or exploit a possible heterogeneity of the future communication networks.

Figure 2:
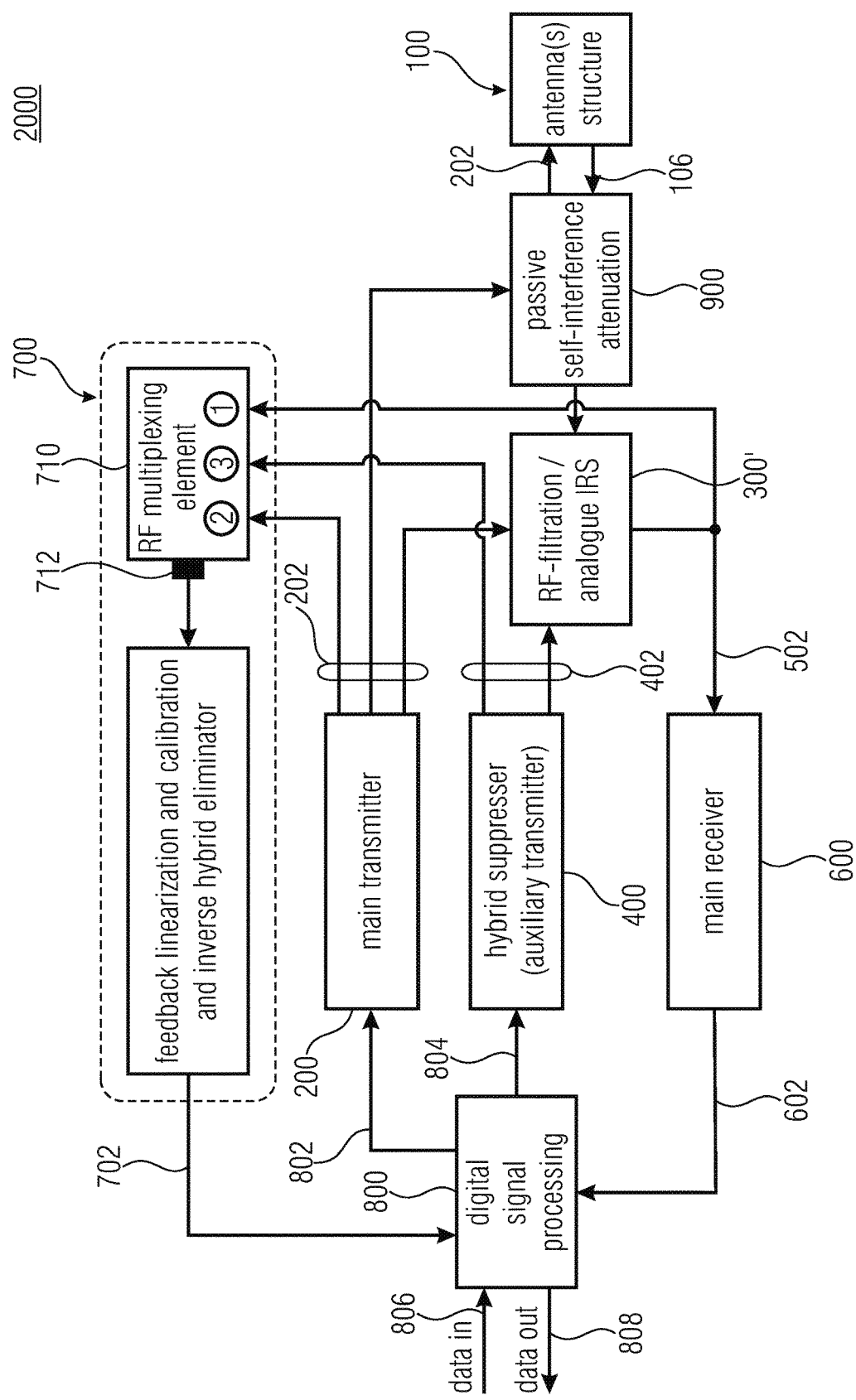
FIG. 2 shows a schematic block diagram of a transceiver according to a further embodiment.

FIG. 2 shows a schematic block diagram of a transceiver 2000 according to an embodiment. When compared to the transceiver 1000, the transceiver 2000 comprises a passive attenuation element 900 configured for attenuating an interfering influence of the sending signal 202 to the receiving signal 106. The passive attenuation element 900 may be configured for essentially leave the receiving signal 106 unattenuated or attenuated at a low level. The passive attenuation element 900 may be arranged between the main transmitter 200 and the main receiver 600. The attenuation element 900 may comprise, for example, a radio frequency circulator configured for interconnecting the antenna arrangement 100 and the main transmitter 200 and for interconnecting the antenna arrangement 100 and the main receiver 600. The passive self-interference attenuation (passive attenuation element 900) may comprise attenuating materials and/or a distance arranged between one or more signal lines for attenuating self-interference.

When compared to the transceiver 1000, the transceiver 2000 may comprise a modified analog domain filter 300', which also implements the functionality of the analog interference removal stage 400 of transceiver 1000. For example, the analog domain filter 300' may comprise one or more signal adders or summarizing nodes to implement the functionality of the interference removal stage 500.

The feedback receiver 700 comprises a multiplexer 710 configured for receiving the preliminary enhanced signal 502 generated or received from the analog domain filter 300' (or alternatively from the analog interference removal stage 500). The multiplexer 710 is further configured for receiving the sending signal 202. The multiplexer 710 is configured for providing the preliminary enhanced signal at an output 712 of the multiplexer 710 when being in the first operating mode and for providing the sending signal 202 at the output 712 when being in the second operating mode. The feedback receiver 700 and the multiplexer 710 may comprise a third operating mode. The feedback receiver 700, the multiplexer 710 respectively, may be connected to the auxiliary transmitter (hybrid suppressor) 400 and may configured for receiving auxiliary transmission signal 402. At the third operating mode, the multiplexer 710 may be configured for providing the second interference cancellation signal 402 at the output 712 such that the feedback receiver 700 provides the feedback signal 702 based on the second interference cancellation signal 402 at the third operating mode. The feedback receiver 700 being in the third operating mode may allow for the processor 800 to pre-equalize the digital transmission signal 802 based on the feedback signal 702.

The processor 800 may be configured for determining a measure relating to the digital interference cancellation signal 822 being deterministic. The processor 800 may further be configured to control the digital self-interference canceler 820 so as to determine the digital interference cancellation signal 822 based on the input signal 806 and based on the digital receiving signal 602 when the measure is above or equal to a threshold value, i.e. when the digital interference cancellation signal is essentially deterministic. The processor 800 may be configured to control the digital self-interference canceler 820 so as to determine the digital interference cancellation signal 822 based on the feedback signal 702 and based on the digital receiving signal 602 when the measure is below the threshold value. For example, the processor 800 may be configured for determining the measure relating to the digital interference cancellation signal 822 being deterministic based on a correlation of the input information signal 806 and the digital receiving signal 602. A measure of correlation may be used for determining, if the digital cancellation signal is deterministic.

Blocks 2002 may be understood as signal nodes, i.e., a signal entering the block 2002 may be received by different other blocks, e.g., 710, 310 and 900. Blocks 2002 may be understood as dots interconnecting signal lines.

In other words, FIG. 2 shows a block diagram of the agile full-duplex wireless transceiver's essential components, i.e., the major components of the agile full-duplex transceiver and interconnectivity between them. The transceiver 2000 comprises two transmission chains, two receiving chains, the baseband digital signal processing unit (processor 800) and some other components in the radio frequency domain which may be majorly dedicated for self-interference cancellation purposes. These components will be described in more detail below, wherein the assignment and general functionality will be specified for each component.

One of the two transmission chains is the main transmitter which may be implemented conventionally and which may exist in any half-duplex wireless transceiver. The main transmission chain takes the baseband signal (digital transmission signal) 802 which may be fed to it by the digital signal processing unit (processor) 800. The signal may be up-converted to the RF domain for normal transmission purposes. The second transmission chain, i.e. the auxiliary transmitter or hybrid suppressor 400, may implement a functionality of a transmission chain additionally and may have a similar structure to the first transmission chain. The second transmission chain may be not placed in the transceiver structure for transmission purposes. The second transmission chain may rather be dedicated to self-interference suppression purposes, especially when the transceiver is supposed to operate in full-duplex mode. The baseband digital signal, i.e. the digital auxiliary signal 804, may be fed to the hybrid suppressor 400 by the digital signal processing unit 800. The hybrid suppressor may in its turn up-convert the digital signal and may inject it in the RF domain to the transceiver. Simplified, the second interference cancellation signal 402 may injected into the receiving signal 106, i.e. combine both signals. This may provide the hybrid suppressor unparalleled flexibility in canceling any unwanted signal in the RF domain of the agile full-duplex transceiver, such as the filter relaxation and frequency gap mitigation case where the hybrid suppressor may be used to cancel the out-of-band emissions.

An agile full-duplex transceiver according to embodiments may also contain two receiving chains, the first one may be the main receiver 600, which may be implemented conventionally and may be utilized for reception purposes as classical transceiver structures. The second receiving chain may be referred to as the feedback receiver or the feedback linearization and calibration and inverse hybrid eliminator block 700. This receiving chain may down-convert the delivered RF signal from the RF multiplexing element (RF multiplexer 710) to the digital domain. This down-converted signal (feedback signal 702) may be delivered to the digital signal processing block 800. The feedback receiving chain may be placed or arranged in the transceiver structure for multiple purposes. A first usage of the feedback receiver 700 may be a linearization and calibration, wherein the feedback receiver 700 may down-convert the RF output signal from one of the transmission chains. Which signal is down-converted may depend on the configuration of the RF multiplexer 710, i.e. which signal is fed to the rest of the feedback receiver. These down-converted digital samples may be utilized by the digital signal processing unit 800 to calculate non-linear models and calibration parameters for both primary transmission chain (main transmitter) 200 and the hybrid suppressor 400.

A second usage may be the self-interference signal eliminator, wherein the self-interference signal (second interference cancellation signal 402) may be down-converted from the RF domain to be canceled in the digital domain by means of the feedback receiving chain 700. During a so-called elimination mode, the down-converted digital samples may be delivered to the digital signal processing unit 800 in which the digital self-interference elimination may be implemented, for example by digital self-interference cancellation. A physical realization (implementation) of the feedback receiver 700 may be similar to an implementation of the ordinary receiver (main receiver) 600. However, it may differ with respect to some specification, such as the supported bandwidth.

The digital signal processing unit 800 may be referred to as a key-enabler in the agile full-duplex transceiver 2000 or may be referred to even as the most valuable component. This unit receives the digital transmission samples stream, indicated as Data-in, i.e. the input information signal 806. The processor 800 may deliver the received samples digital data stream, indicated as Data-out, i.e. as output signal 808. An interconnectivity between the digital signal processing unit 800 and the rest of the agile full-duplex transceiver components is illustrated in the block diagram of FIG. 2, where the data flow directions are indicated by the direction of the arrows. The processor 800 may be configured for implementing all digital signal processing, including estimation, calculation, pre-equalization, pre-distortion and self-interference elimination.

Pilot signals may be transmitted through the transmission chains and may be collected once again via both or one of the receiving chains, based on the knowledge of the transmitted digital data samples and the collected information, the digital signal processing unit 800 may obtain the estimated values of the parameters that may be used or that are desired. The estimated values may be saved in the digital signal processing unit 800 or an external storage in order to be utilized afterwards to construct digital filters and/or for configuring some RF components such as the analog domain filter 300 or 300'. The digital signal processing unit may provide, for example, the hybrid suppressor 400 with digital data samples. These samples may be pre-distorted and/or pre-equalized by the digital signal processing unit. The pre-distortion and/or pre-equalization may be done by a constructed digital model inside the digital signal processing unit 800 based on the estimated parameters, for example, using a parameter acquisition unit. The pre-distortion and/or the pre-equalization may be applied to the primary digital data stream (digital transmission signal) in a similar manner. The estimated parameters may be used as well to configure the values of some RF digitally configurable components, such as the RF-filtration block 300 or 300'. The digital signal processing unit 800 may also be responsible for the digital residual self-interference elimination either by utilizing a correlated down-converted signal delivered by the feedback receiver 700 and/or by utilizing the knowledge of the digital baseband and the estimated parameters to build up a solely digital model.

Other or the rest of the transceiver components may be located in the radio frequency domain. The passive self-interference attenuation element 900 may encompass any method or RF component which attenuates the leakage of the transmission signal 202 to the ordinary receiver 600 without introducing any significant reduction to the transmission signal power in the direction of the desired transmission. The RF-filtration block 300 or 300' may utilize a portion of the primary transmission RF signal and may inject it at the RF domain of the ordinary receiver 600, for example, by means of the analog interference removal stage 500 for self-interference suppresses purposes. This RF signal may be modified by an RF network which may increase the matching factor between the self-interference signal and the cancellation one. It may additionally invert the cancellation signal amplitude.

Figure 3:
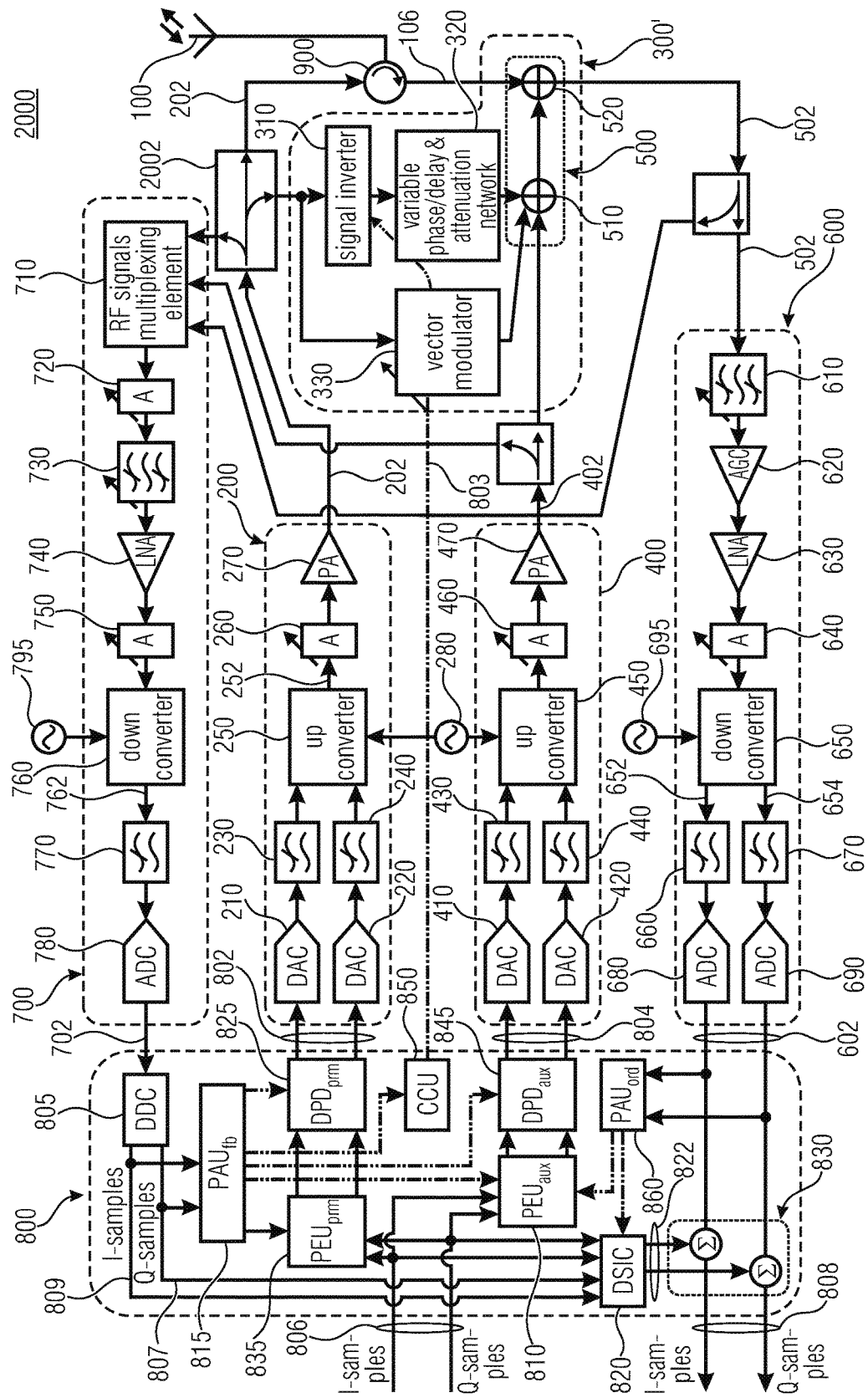
FIG. 3 shows a detailed block diagram of the transceiver illustrated in FIG. 2 according to an embodiment.

FIG. 3 illustrates a detailed block diagram of the transceiver 2000 according to an embodiment. The processor 800 is configured for providing the digital transmission signal 802 based on a first component and a second component, wherein the first component may be understood as a so-called I-samples and wherein the second component may be referred to as so-called Q-samples, i.e. a real portion and an imaginary portion of the signal may be provided and processed separately.

The main transmitter 200 may comprise a first digital to analog converter (DAC) 210 configured for converting the digital first portion into an analog version thereof. The main transmitter 200 may comprise a second digital to analog converter 220 configured for providing an analog version of the digital second component of the digital transmission signal 802. A first and a second filter 230 and 240, for example a low-pass filter, may be configured for filtering the signals of the DACs. An up-converter 250 may be configured for combining the filtered analog portions and for providing a combined signal 252 comprising an RF-frequency. A variable attenuator 260 and a power amplifier (PA) may be arranged to obtain the sending signal 202. For example, the auxiliary transmitter 400 comprises DACs 410 and 420 for receiving the first and second portion of the auxiliary transmission signal 804. The auxiliary transmitter 400 may comprise the low-pass or baseband filters 430 or 440 and an up-converter 450 and may comprise a variable attenuator 460 and a power amplifier 470 as described for the main transmitter 200. The up-converter 250 and the up-converter 450 may be connected to a local oscillator 280 configured for determining an operation frequency or conversion frequency of the main transmitter 200 and of the auxiliary transmitter 400.

Simplified, the analog domain filter 300 may be configured for generating the first interference cancellation signal 302 based on a signal inversion, based on an attenuation and/or based on phase manipulation. The phase manipulation may comprise a delay of the signal (broadband) or a phase shifting (narrow band). The processor may be configured for adapting a parameter of the attenuation or of the phase manipulation.

The main receiver 600 may comprise a filter 610, for example, a bandpass filter for receiving and filtering the preliminary enhanced signal 502. The main receiver 600 may comprise an automatic gain controller (AGC) 620 and/or a low noise amplification (LNA) stage 630; may comprise one or even more LNAs. A variable attenuator 640 may be configured for attenuating the amplified signal. The main receiver 600 may comprise a down-converter 650 configured for down-converting the filtered, amplified and/or attenuated preliminary enhanced signal 502 and to obtain a first portion 652 and a second portion 654 of the down-converted signal. The first and the second portion may represent the I-samples and the Q-samples. The main receiver 600 may comprise low-pass filters 660 and 670 configured for filtering the signals 652 and 654. The main receiver 600 may comprise analog-to-digital converters ADC 680 and 690 configured for providing a digital representation of the filtered signals 652 and 654. An operation or conversion frequency of the down-converter 650 may be influenced or controlled by an oscillator 695.

In a similar way, the feedback receiver 700 may comprise a variable attenuator 720, a bandpass filter 730, a low-noise amplifier 740, a variable attenuator 750, a down-converter 760, a low-pass filter 770 and an analog-to-digital converter 780. The operation or conversion frequency of the down-converter 760 may be influenced or controlled by a local oscillator 795. The transmitters 200 and 400 and the receivers 600 and 700 are illustrated as an example only. Each transmitter and each receiver may be implemented or configured differently. The oscillators 280, 695 and 795 may operate at equal or different frequencies. The down-converter 760 may be configured for providing a signal comprising the real portion and the imaginary portion, i.e. the feedback signal 702 may comprise the I-samples and the Q-samples. The down-converter 760 may be operate at a lower down-conversion frequency when compared to the down-converter 650. Simplified, the down-converter 650 may be configured for processing the I-samples and the Q-samples separately and may thus operate at a higher (e.g. double) frequency.

Simplified, the main receiver 600 may comprise a first down-converter 650 configured for providing a first portion of a down-converted signal at a first output, the first portion comprising an imaginary (Q) portion of the preliminary enhanced signal, and for providing a second portion of the down-converted signal at a second output, the second portion comprising a real portion (I) or the preliminary enhanced signal 502 or vice versa. The feedback receiver 700 may comprise the down-converter 760 configured for providing a down-converted signal 762 comprising an imaginary and a real portion. The processor 800 may comprise a digital down-converter 805 for obtaining an imaginary portion 807 and a real portion 809 of the feedback signal 702.

The analog-domain filter 300' may comprise a signal inverter 310, a variable phase/delay and attenuation network 320 and a vector modulator 330. The signal inverter 310 and the variable phase/delay and attenuation network 320 may be configured for inverting, attenuating and implementing a phase shift or a delay to a received signal. The variable phase/delay and attenuation network 320 may be configured for attenuating and phase shifting or delaying the inverted sending signal 202 received from the signal inverter 310. Alternatively, an order of the signal inverter 310 and of the variable phase/delay and attenuation network 320 may be switched, i.e. the signal inverter may configured for inverting an attenuated and phase shifted or delayed signal. The vector modulator 330 may be configured for modifying the sending signal 202.

The analog interference removal stage 500 may comprise at least one combiner 510 and/or 520 and may be configured for combining the auxiliary transmission signal 402 and the output of the vector modulator 330 and the inverted, attenuated and phase shifted or delayed signal and the receiving signal 106 to obtain the preliminary enhanced signal 502.

The processor 800 may comprise the parameter acquisition unit (PAU) 815 configured for receiving the feedback signal 702 (index fb). The index "prm" relates to elements related to the primary (main) transmitter 200. The index "aux" relates to elements related to the auxiliary transmitter 400. The parameter acquisition unit 810 may be configured for receiving the signals 807 and 809 and for determining one or more parameters for pre-equalizing and/or pre-distorting the digital transmission signal 802 based thereon. The processor 800 may comprise a digital pre-distorter (DPD) 825 configured for pre-distorting the digital transmission signal 802. The parameter acquisition unit 815 may be configured for controlling or adjusting the pre-equalization unit 810 and/or the digital pre-distorter 825. For example, the parameter acquisition unit may determine linear and/or non-linear distortions determined based on the feedback signal 702 (based on the signals 807 and 809 respectively), for example, when the feedback signal 702 is obtained based on the sending signal 202. This may allow for determining distortions obtained by the main transmitter 200 and to pre-equalize and/or to pre-distort those distortions.

The processor 800 may comprise a pre-equalizer 835 and/or a digital pre-distorter 845 configured for pre-distorting the auxiliary transmission signal 804 as was described for the pre-equalizer 810 and the pre-distorter 825. Tus, the processor 800 may comprise the linear pre-equalizer 835 configured for pre-equalizing the digital transmission signal 202 based on the digital receiving signal 602 or based on the feedback signal 702.

The parameter acquisition unit 815 may be configured for controlling or adjusting the PEU 835 and/or the DPD 845. Simplified, the input information signal 806 may be pre-equalized and/or pre-distorted independently for the main transmitter 200 and for the auxiliary transmitter 400. The processor 800 may comprise a control and calibration unit (CCU) 850 configured for calibrating and controlling the elements 320 and/or 330 of the analog domain filter 300 or 300' based on the control signal 803. The CCU 850 may be controlled based on the parameter acquisition unit 815. In other words, the CCU 850 block may contain two DACs that generate two analog baseband signals (I and Q streams (i.e., the control signal 803) that modify the vector modulator RF output signal in way that enriches the self-interference cancelation signal by multipath components suppression characteristic. The delivered estimations from the PAU$_{fb}$ 815 to the CCU 850 may be linear estimations of the main transmitter chain 200 with and without the radio self-interference radio channel. This can be done by means of the feedback linearization and calibration chain supported 700 by the RF multiplexing element 710.

That is, the processor 800 may be configured for parametrizing the linear pre-equalizer 810 based on the feedback signal 702. The processor comprises a non-linear pre-distorter 825 and/or 845 configured for pre-distorting the digital transmission signal 802, the digital auxiliary signal 804 respectively, based on the feedback signal. The transceivers described herein may be configured for operating in the in-band full-duplex mode but may alternatively or in addition be configured for operating in the FDD mode and/or in the TDD mode. According to embodiments, transceivers may be configured for switching between full-duplex and FDD and/or TDD operation in different time intervals.

The processor 800 may comprise a further parameter acquisition unit 860 configured for receiving the digital receiving signal 602 and for determining parameters based on the digital receiving signal 602, for example, by determining a correlation between the input information signal 806 and the digital receiving signal 602. The parameter acquisition unit 860 may be configured for influencing or controlling the pre-equalization unit 835. The parameter acquisition unit 860 may be configured for controlling the digital self-interference cancellation block 820 to obtain different digital interference cancellation signals 822 which will be described in more detail later on.

For example, the processor 800 may be configured, e.g. during a first time interval, to provide the digital transmission signal 802 to the main transmitter 200 and to control the feedback receiver 700 such that the feedback receiver operates in the first operating mode, i.e. receives the preliminary enhanced signal 502. During first time interval, the processor 800 may be configured for determining a parameter of the linear pre-equalizer 810 and for parametrizing the analog domain filter 300 or 300' based on the feedback signal 702. During a second time interval, the processor may be configured to provide the digital auxiliary signal 804 to the auxiliary transmitter 400 and to control the feedback receiver 700 such that the feedback receiver operates in the second operating mode, i.e. receives the sending signal 202. Simplified, the processor 800 may be configured for parametrizing the analog domain filter 300 or 300' based on the feedback signal 702.

In other words, FIG. 3 shows an implementation example illustrating an agile full-duplex wireless transceiver embodiment according to a full constellation alternative.

wherein the primary transmitter 200 and the hybrid suppressor 400 are realized by means of a direct-up-conversion transmission chain structure. The primary transmitter chain comprises in this order starting from the digital domain and ending up at the radio frequency domain: digital-to-analog converters 210 and 220, 410 and 420, respectively, baseband filters 230 and 240, 430 and 440, respectively, up-conversion mixer 250, 450, respectively, a shared local oscillator 280, wherein shared relates to the oscillator 280 being connected to the primary transmitter 200 and the auxiliary transmitter 400, variable attenuators 260, 460 respectively, and power amplifiers 270, 470, respectively.

The hybrid suppressor chain 400 may have a similar structure to the primary transmitter 200 and shares the same local oscillator 280, which could be separately supplied as well.

The ordinary receiver 600 is realized by means of the direct-down-conversion receiving chain structure. The ordinary receiver chain 600 comprises in this order starting from the radio frequency domain and ending up at the digital domain: adjustable RF-filter 610, automatic gain controller 620, low noise amplifier 630, variable attenuator 640, down-conversion mixer 650, local oscillator 695, baseband filters 660 and 670 and analog-to-digital converters 680 and 690. The feedback linearization and calibration and inverse hybrid eliminator (feedback receiver) 700 is realized by means of the RF multiplexer 710, the variable attenuator 720, the adjustable RF filter 730, low-noise amplifier 740, variable attenuator 750, down-conversion mixer 760, local oscillator 795, baseband filter 770 and analog-to-digital converter 780. The functionality of the variable attenuator 720 and 750 may be summarized using one variable attenuator. Although the RF multiplexer 710 is described as being part of the feedback receiver 700, the RF multiplexer 710 may be an independent block.

The RF-filtration block 300 or 300' may be realized by two parallel RF links, the signal in the first link may be inverted by means of suitable RF component (signal inverter 310) and may be processed by a network of delay and attenuation components, i.e. the variable phase/delay and attenuation network 320. The components may be digitally configurable. The signal (transmission signal 202) in the second RF link may be processed by the vector modulator 330 that is controlled by the DSP block.

The passive self-interference attenuation block 900 is realized by an RF circulator according to the illustrated embodiment. A single antenna 100 may be connected to the transceiver front-end. The digital signal processing unit 800 is realized by means of a plurality of internal DSP blocks. The primary transmission signal is led through a linear pre-equalization unit 835 and non-linear digital pre-distortion unit 825.

Similar to the primary transmission signal, the hybrid suppressor transmission signal is led in the digital domain through a linear pre-equalization unit 810 and a non-linear digital pre-distortion unit 845. The pre-equalization units (PEU) and digital pre-distortion units (DPD) receive their useful parameters from the (ordinary, sub index ord) parameter acquisition unit 860 and the feedback parameter acquisition unit 815 is based on an estimation procedure described later on.

The control and calibration unit (CCU) 850 may configure the RF filtration 300 or 300', programmable components thereof respectively and may provide the vector modulator 330 with its control signals. The CCU 850 may receive its useful parameters from the feedback parameter acquisition unit 815. The digital self-interference canceler 820 may acquire its parameters from the ordinary parameters acquisition unit 860. While using the digital baseband samples, the digital self-interference canceler 820 may cancel the residual self-interference digitally.

Figure 4:
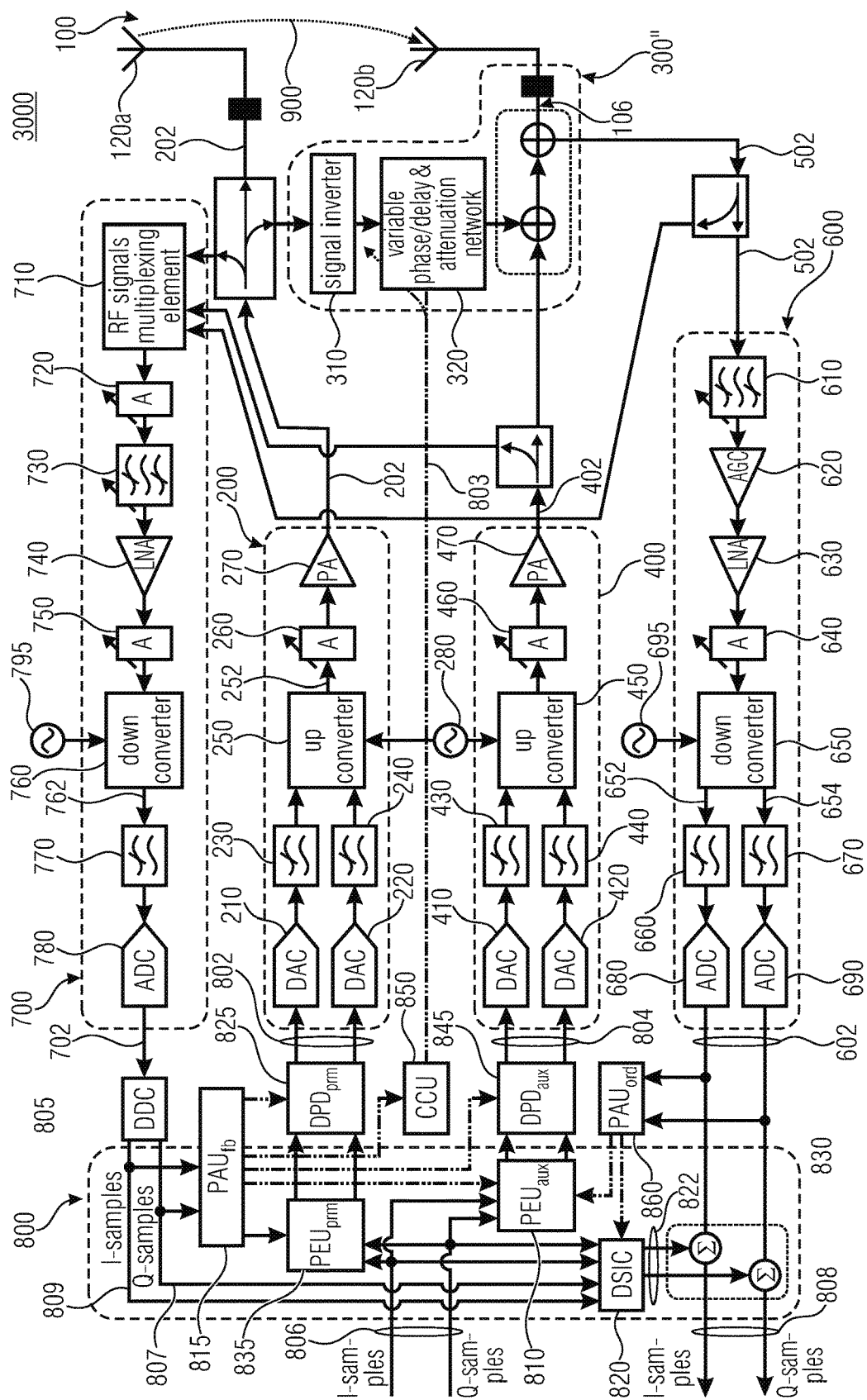
FIG. 4 shows a schematic block diagram of a modified transceiver according to a further embodiment.

FIG. 4 shows a schematic block diagram of a transceiver 3000 according to a further embodiment. When compared to the transceiver 2000 illustrated in FIG. 3, the transceiver 3000 may comprise an analog digital filter 300" being implemented without the vector modulator illustrated in FIG. 3. The antenna arrangement 100 comprises a first antenna element 120a configured for transmitting the sending signal 202 to the wireless transmission channel. The antenna arrangement 100 comprises a second antenna element 120b configured for receiving the receiving signal from the wireless transmission channel and for providing the receiving signal 106. A distance between the antenna elements 120a and 120b allows for an implementation of the passive self-interference attenuation 900. The first antenna element 120a and the second antenna element 120b may comprise a polarization different from each other, such as horizontal and vertical or vice versa (cross polarization). A polarization different from each other may allow for an additional passive self-interference attenuation. An RF absorption materials or any other blocking object may be placed between the antenna elements 120a and 120b and may allow for a passive self-interference attenuation.

In other words, FIG. 4 illustrates the agile full-duplex wireless transceiver according to an embodiment with two dedicated transmit and receive antennas. A realization of the RF-filtration 300" and passive self-interference attenuation 900 may differ from the realization of transceiver 2000. The RF-filtration may be implemented by means of one direct RF-link, which is equipped with the signal inversion 310 and programmable delay and attenuation network 320. That is, the RF-filtration 300" may be realized without a second RF link comprising the vector modulator 330. Additionally, the passive self-interference attenuation 900 may be realized through antenna-related techniques such as physical separation and exploiting a different polarization for the transmit 120a and receive 120b antennas, i.e., exploits a physical separation. The embodiment utilizes two dedicated antennas for transmitting and receiving, which could also be realized by utilizing one transmit/receive antenna through RF circulatory connectivity as described with respect to FIG. 3.

Figure 5:
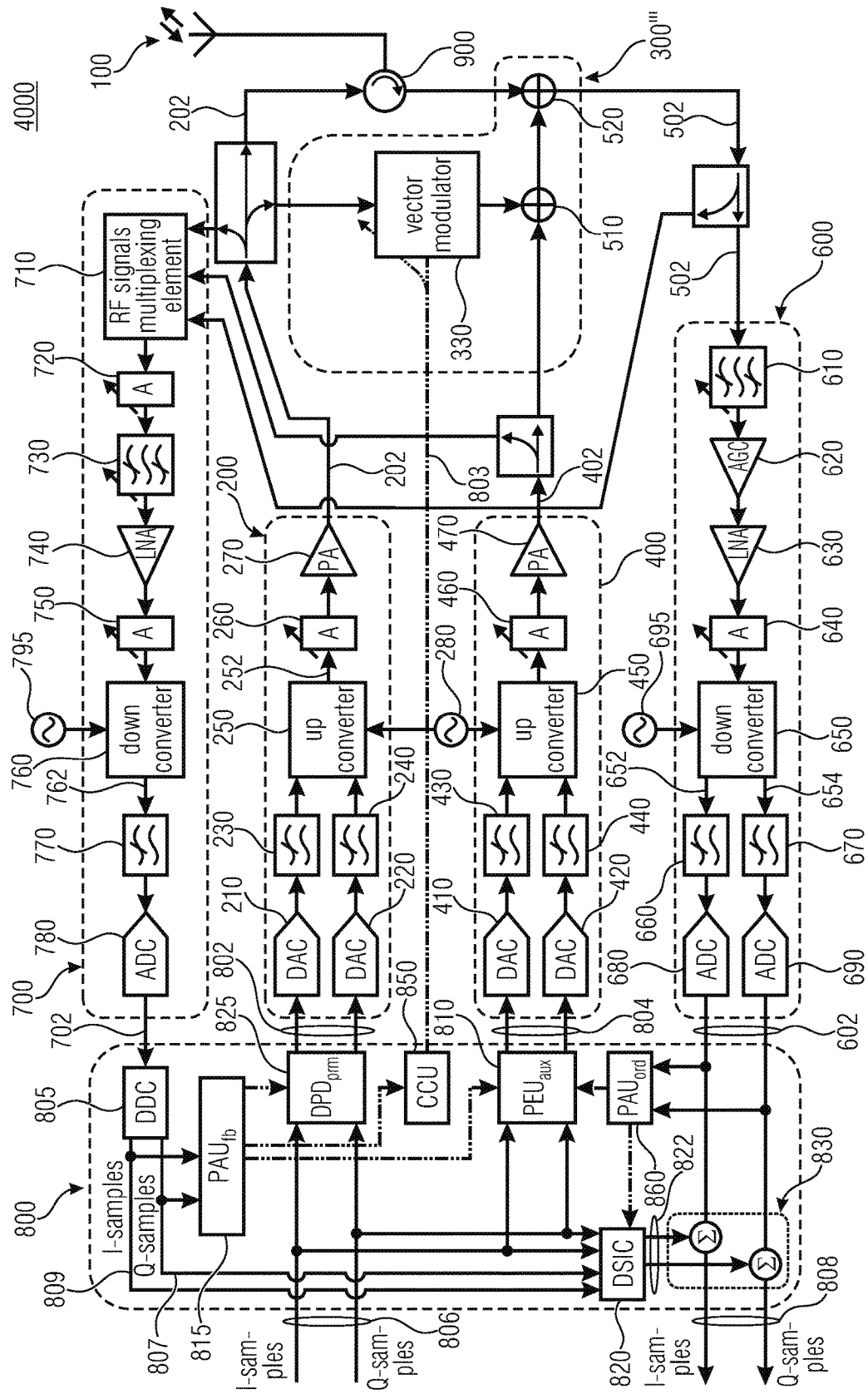
FIG. 5 shows a schematic block diagram of a further transceiver according to an embodiment.

FIG. 5 shows a schematic block diagram of a transceiver 4000 according to an embodiment. When compared to the transceiver 2000 illustrated in FIG. 3, an analog domain filter 300''' may comprise the vector modulator 330 while not comprising the signal inverter 310 and the variable phase/delay and attenuation network 320. A processor 800' may be modified when compared to the processor 800. The processor 800' may be implemented without the digital pre-equalization unit 835 and without the digital pre-distorter 845. In other words, FIG. 5 shows the agile full-duplex wireless transceiver with simplified digital signal processing. The digital signal processing block elements may be reduced to linear pre-equalizer 810 for the hybrid suppressor 400 and non-linear pre-distorter 825 for the primary transmitter 200. The RF-filtration 300''' may be realized in this embodiment by means of one RF link equipped with the vector modulator 330. Alternatively, it may also be realized as described with respect to analog domain filter 300, 300' or 300'', i.e. comprising two RF links, or one RF link with delay and attenuation network.

The processor 800 or 800' may be configured for adjusting a down-conversion frequency of the feedback transceiver 700 or of the main transceiver 600. The processor 800 or 800' may alternatively or in addition be configured for adjusting an up-conversion frequency of the main transmitter 200 or of the auxiliary transmitter 400 to adjust a frequency band of the transceiver used for transmitting and/or sending. By adjusting a down-conversion frequency and/or an up-conversion frequency, a frequency band utilized by the respective transceiver may be adjusted. Thus, the transceiver may be agile in terms of varying the frequency band utilized.

Simplified, the above described embodiments may comprise a processor being configured for adjusting a radio frequency self-interference cancellation and a digital self-interference cancellation during a calibration phase and for operating in the in-band full-duplex mode during an active transmission phase between the transceiver and a further transceiver.

Figure 6:
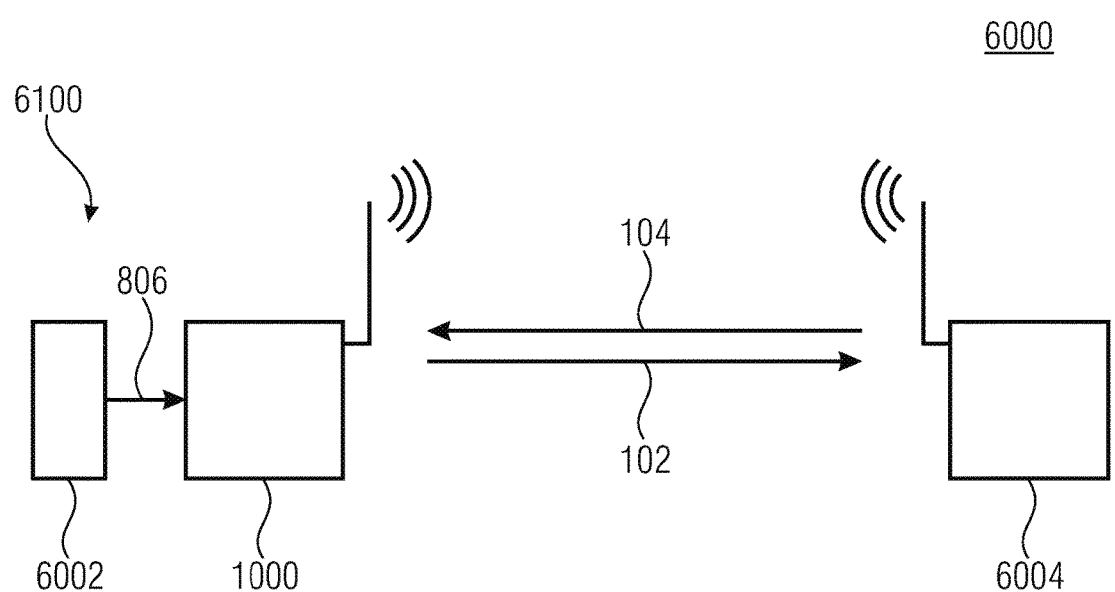
FIG. 6 shows a schematic block diagram of a communications system according to an embodiment.

FIG. 6 shows a schematic block diagram of a communications system 6000 comprising a system 6100 configured for communicating wirelessly with a transceiver 6004. The system 6100 comprises the transceiver 1000, wherein the transceiver 1000 is connected to a data source 6002. The data source 6002 may be, for example, a data storage, a sensor (e.g. a microphone) or a processor. For example, the system 6100 may be one of a mobile communication device (mobile computer or mobile phone), a fixed wireless communication device such as a wirelessly communicating computer, a nomadic communication device such as a mobile device related to an infrastructure and portable communication device.

Figure 7:
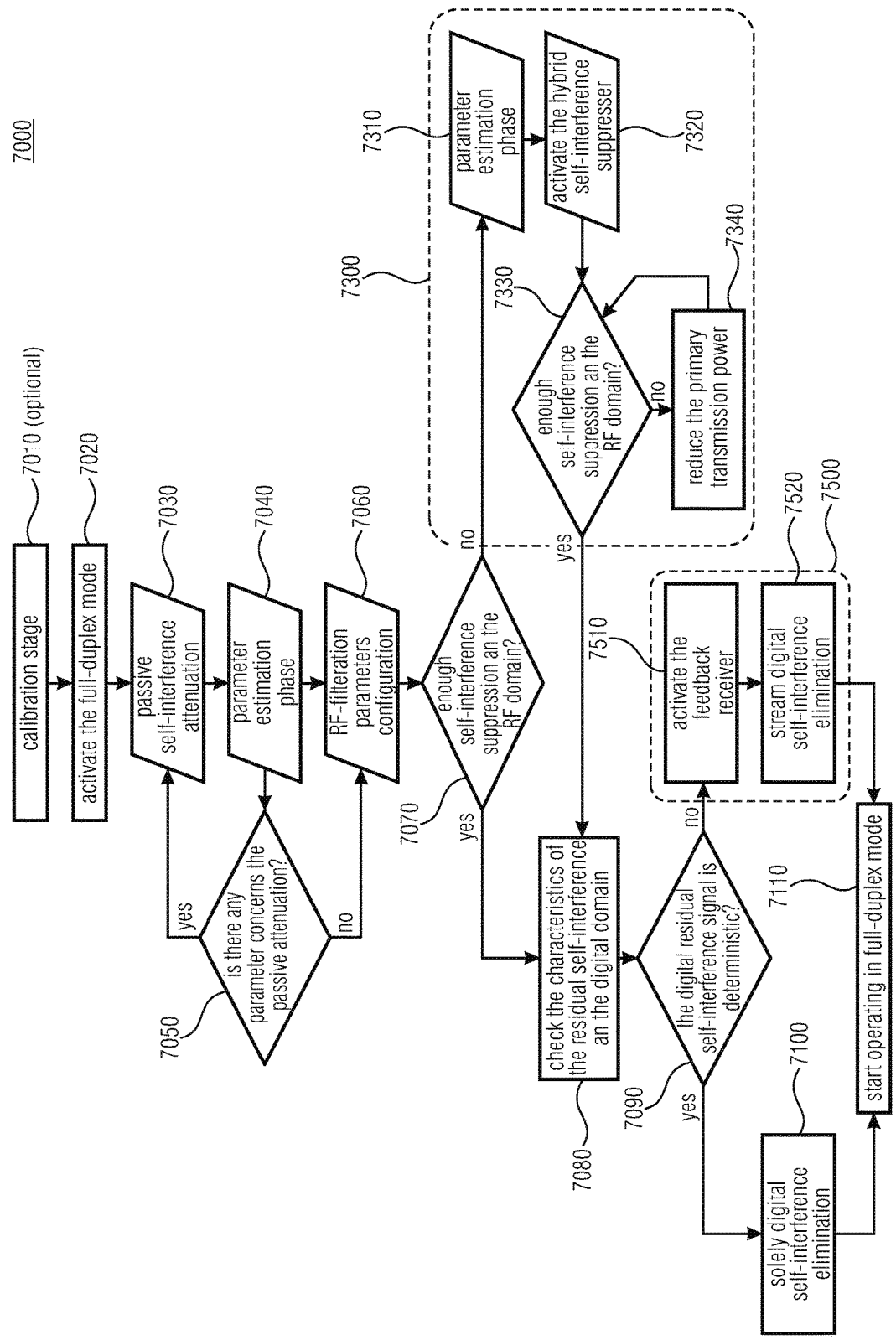
FIG. 7 shows a schematic flow chart of a method for sequentially reducing or canceling self-interference in the RF domain and in the digital domain according to an embodiment.

FIG. 7 illustrates a schematic flow chart of a method 7000 for sequentially reducing or canceling self-interference in the RF domain and in the digital domain. The method 7000 may comprise an optional calibration stage 7010 during which parameters of the digital pre-distorters may be acquired. An estimation of the primary digital pre-distorter 825, of parameters thereof respectively, may be done by means of a predetermined training signal transmitted through the main transmitter 200 and received via the calibration and feedback chain, i.e. the feedback receiver 700, with the support of the multiplexing element 710. For example, the RF signal 202 may be routed after the power amplifier stage 270 in the main transmitter 200 to enter the feedback receiver 700. This may be done in order to acquire the parameters of the auxiliary pre-distorter 845 similarly, with exception for the training signal which may be transmitted through the auxiliary transmitter 400. Any non-linear model may be adopted for the DPDs, for example, a polynomial model [21] or a Volterra model [22].

Based on the existence and the severity of the non-linear behavior, an utilization of the DPDs may be determined. The primary pre-distorter 825 may be considered as being most likely to be activated first of all, while the transmission power that may be used from the main transmitter 200 may be higher than from the auxiliary one.

In a step 7020, the full-duplex mode may be activated. This may include an operation mode of the transceiver. In a step 7030, a passive self-interference attenuation is performed, for example using the passive self-interference element 900, such as the RF-circulator. In a step 7040, parameters of the RF-filtration 300 may be estimated, for example, using the processor 800.

Based on a decision 7050, the step 7030 may be re-performed when a parameter determined in step 7040 may influence (concern) the passive RF attenuation. This may include an operation of passive attenuation element 900. Simplified, at least one parameter of the passive self-interference attenuation may be adapted.

When there are no parameters concerning the passive attenuation, a step 7060 may be performed during which the analog domain filter is configured, for example, controlled by the processor 800.

During a decision 7070, the processor may evaluate if there is enough self-interference suppression at the RF-domain. The processor may be configured for considering a frequency range or a communications standard according to which the transceiver is aimed to operate. For example, enough self-interference suppression may be obtained, in a case where the RF domain filtering allows for a self-interference suppression of at least 10 dB, at least 20 dB or at least 40 dB. For example, a mobile communications standard such as LTE may allow for transmitting a higher amount of power such that a suppression of the self-interference in the RF-domain may higher when compared to a useful or aimed self-interference suppression for a WiFi-standard, according to which a lower amount of power may be transmitted. A criterion for the self-interference suppression being enough, may be a SNR of the input information signal 806 compared to the digital receiving signal 602.

When enough self-interference suppression is achieved at the RF-domain, a step 7080 may be performed, for example using the processor 800, during which the characteristics of the residual self-interference is evaluated at the digital domain. The residual self-interference may be equal to the self-interference signal 822 and may be evaluated for being deterministic or not. When the digital residual self-interference signal 822 is deterministic, a so-called solely digital self-interference elimination 7100 may be performed, i.e. the analog domain filter 300 or 300' in combination with the digital self-interference signal 822 may be considered as allowing for enough self-interference suppression. Simplified, the digital interference cancellation signal 822 may be determined based on the input signal and based on the digital receiving signal when the self-interference characteristic is essentially deterministic. The digital interference cancellation signal 822 may be determined based on the feedback signal 702 and based on the digital receiving signal 602 when the self-interference characteristic is not essentially deterministic.

Sub-methods 7300 and 7500 are described in the following. Both sub-methods 7300 and 7500 are optional. Thus, decisions 7070 and 7090 are also optional. For example, when sub-method 7300 is not implemented, decision 7070 may remain undecided (not present). When sub-method 7500 is not implemented, the decision 7090 may be undecided (not present).

Sub-method 7300 comprises a parameter estimation phase. The parameter acquisition unit 860 may determine parameters based on the digital receiving signal 602, the digital receiving signal 602 being obtained based on the third operating mode, i.e. based on the auxiliary transmission signal 402. In a step 7320, the hybrid self-interference suppressor 400 may be activated.

A decision 7330 may comprise a re-evaluation if enough self-interference suppression is achieved at the RF-domain. Decision 7330 may be equal to decision 7070. Decision 7330 being decided as yes may lead to the step 7080. A decision being no may lead to a step 7340 in which a primary transmission power of the sending signal 202 and therefore of the wireless sending signal 102 is reduced.

Sub-method 7500 may be performed when decision 7090 is decided as no. In a step 7510 the feedback receiver 700 may be activated. In a step 7520 a digital self-interference elimination signal may be generated by the feedback receiver 700. For example, the feedback receiver 700 may be operated in the third operating mode. Alternatively, the feedback receiver may be operated in the first or second operating mode. When compared to the step 7100, an operation of the feedback receiver 700 during communications of the transceiver may lead to a higher power consumption but may allow for a higher degree of self-interference suppression. The step 7100 and the step 7520 may both result in a step 7110 comprising a start of an operation of the transceiver in the in-band full-duplex mode.

In other words, in the in-band full-duplex scheme, the self-interference signal may be relatively very strong, which may prevent the reception of the remote desired signal (receiving signal) unless the self-interference signal is sufficiently suppressed. Due to the overwhelming nature of the self-interference signal, the suppression of this signal is not practically realized within one single step. Therefore, the agile full-duplex transceiver according to embodiments may cancel the self-interference by means of a successive self-interference cancellation mechanism. The successive self-interference cancellation mechanism may suppress the self-interference signal through concatenated stages in order to eliminate the self-interference.

Method 7000 is depicted as a method which may be partially or completely executed by an agile full-duplex transceiver according to embodiments in order to cancel the self-interference signal. The transceiver may start to operate in full-duplex mode. As shown in the flowchart, the first self-interference cancellation mechanism that the transceiver invokes is the passive self-interference attenuation. Right after the self-interference signal is passively attenuated in the RF domain, the transceiver may estimate all of the useful parameters for the next stage. The transceiver may check afterwards if there is any parameter that can be set in the passive attenuation block to increase the attenuation performance of the passive suppression stage. The transceiver may cycle back to the estimation phase if this is the case.

The next stage in the successive self-interference is where the estimated parameters are utilized to configure the hardware that belongs to the RF-filtration block. This stage is depicted in the method in the block (RF-filtration parameters configuration). The next decision making block (7090) measures the residual self-interference at the RF domain and accordingly determines whether the self-interference suppression is sufficient or is needed to be suppressed even further. Based on the previous stage, the receiver continues in one of the following way: the first way is where the transceiver proceeds to the digital domain and does some further suppression mechanisms described herein.

The second way for the transceiver is to suppress the self-interference in the RF domain further and then proceed to the digital domain likewise in the first way to suppress the self-interference in the digital domain. This may be performed to suppress the self-interference further. The further suppression in the RF domain may be done by utilizing the hybrid suppressor (auxiliary transmitter), wherein the algorithm may propose a stage of estimation that may collect all of the useful parameters for the hybrid suppressor (parameter acquisition unit 860). The estimated parameters may be exploited by the digital signal processing unit to construct a digital function that pre-distorts and/or pre-equalizes the digital samples before they are provided the hybrid suppressor transmission chain. Then the hybrid suppressor may inject its signal at the RF domain of the transceiver in order to suppress the self-interference over there. At this stage, the transceiver may be supposed to achieve a sufficient self-interference suppression at the RF-domain or may at least reach the maximum achievable suppression considering the available transceiver resources and transmission signal characteristics. For example, when considering a worst case scenario, the algorithm may consider for any reason that the RF self-interference may be not sufficiently suppressed and cannot be suppressed anymore (in the RF domain).

The algorithm may then reduce the primary transmission power, see step 7340. The last stage in the successive self-interference cancellation mechanism may be the digital residual self-interference elimination. In the digital domain the residual self-interference may be measured and characterized by means of the digital signal processing unit, i.e. the processor 800 or 800'. Accordingly, the decision 7090 may be made (as far as present) based on the characteristics of the residual self-interference signal. Either a solely digital approach or a feedback digital elimination may be used. In the case where the residual self-interference signal is purely or dominantly (essentially) a deterministic one, the solely digital approach may be used as follows. The second case, where the residual self-interference signal is significantly (essentially) contaminated by non-deterministic disturbances, the feedback digital elimination may be used by the successive self-interference cancellation. In the solely digital approach, the baseband samples and digital filters may be utilized in the digital signal processing unit to suppress the self-interference signal. While in the feedback digital approach the feedback receiver 700 may down-convert the self-interference signal from the RF domain and this signal may be exploited with some other digital filters to suppress the self-interference digitally.

An agile full-duplex wireless transceiver tunable over a large frequency range and able to realize any kind of flexible duplexing between the connected nodes including the most desirable and extreme duplexing scheme which is the in-band full-duplex as where the up-link and down-link frequency bands are completely overlapped and unlike the conventional TDD scheme both links are active all the time (no time discontinuity for duplexing purpose).

The overall architecture of the agile full-duplex wireless transceiver which is depicted in the block diagram in FIG. 2, where in addition to the conventional wireless transceiver five supplementary components—hybrid suppresser, RF-filtration, passive self-interference attenuation, RF multiplexing element, and the feedback linearization and calibration and inverse hybrid eliminator—are introduced to the architecture as key-enabling hardware of the self-interference cancellation mechanism.

The successive self-interference cancellation mechanism that cancels the self-interference signal within multiple concatenated stages in many different locations, the algorithm for which is illustrated in the flowchart in FIG. 7.

The enhancement in frequency division duplexing (FDD) scheme by suppressing the out-of-band emissions, which leads to relax the RF design constrains and mitigating the frequency duplexing gap between the up-link and the down-link bands.

The invented transceiver can replace a wide range of the currently-deployed wireless transceivers and enhancing their duplexing performance. The conventional frequency division scheme of duplexing, or FFD, involves usually a high transceiver standards in order to suppress the signal leakage from the transmission allocated frequency band to the receiving one. This stresses the design constrains of the wireless transceiver in order to achieve high out-of-band attenuation in addition to frequency duplexing gap that has to be left between these two duplexing bands. The agile full-duplex transceiver cancels these out-of-band emissions by means of the successive self-interference cancellation mechanism, and accordingly relaxes the transceiver design constrains—in particularly the RF filters—and allows mitigating the wasted frequency duplexing gap completely or partially. This was concerning the enhancements over the conventional FDD duplexing scheme, however, the proposed in-band full-duplex wireless communication scheme is also enabled by utilizing this novel transceiver. The proposed transceiver architecture with the successive self-interference cancellation mechanism that is supposed to run over it will enable adopting the in-band full-duplex scheme ubiquitously by offering a compact wireless transceiver architecture equipped with its enabling mechanism. Moreover, the transceiver introduces an unprecedented agility to the classical wireless transceivers by allowing tuning the transceiver to wide range of communication frequencies.

Figure 8:
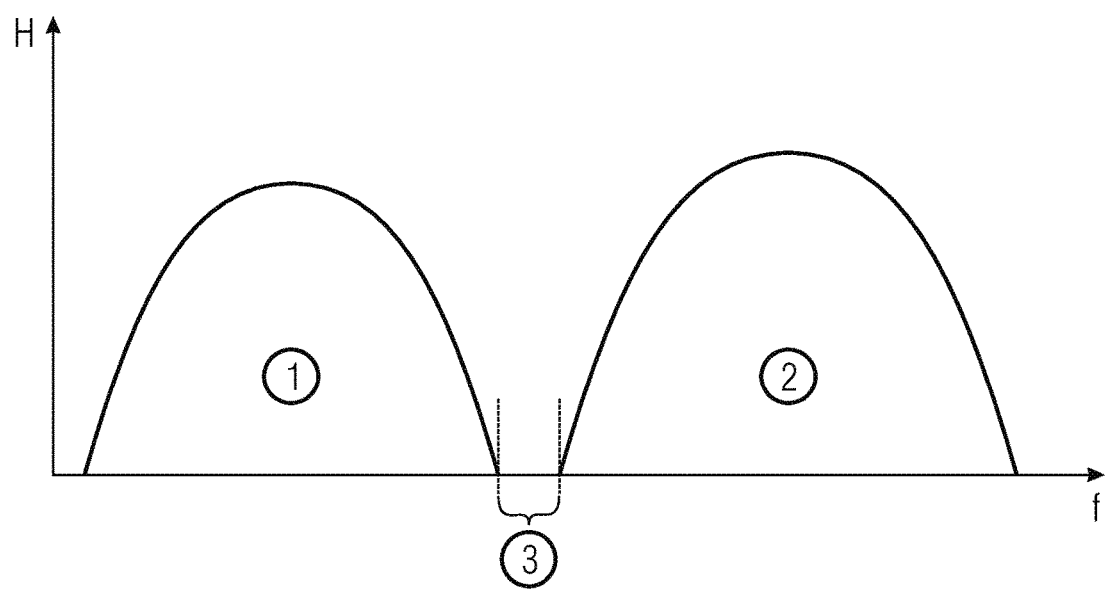
FIG. 8 shows a schematic diagram illustrating a frequency gap which may be reduced based on embodiments described herein.
Figure 9:
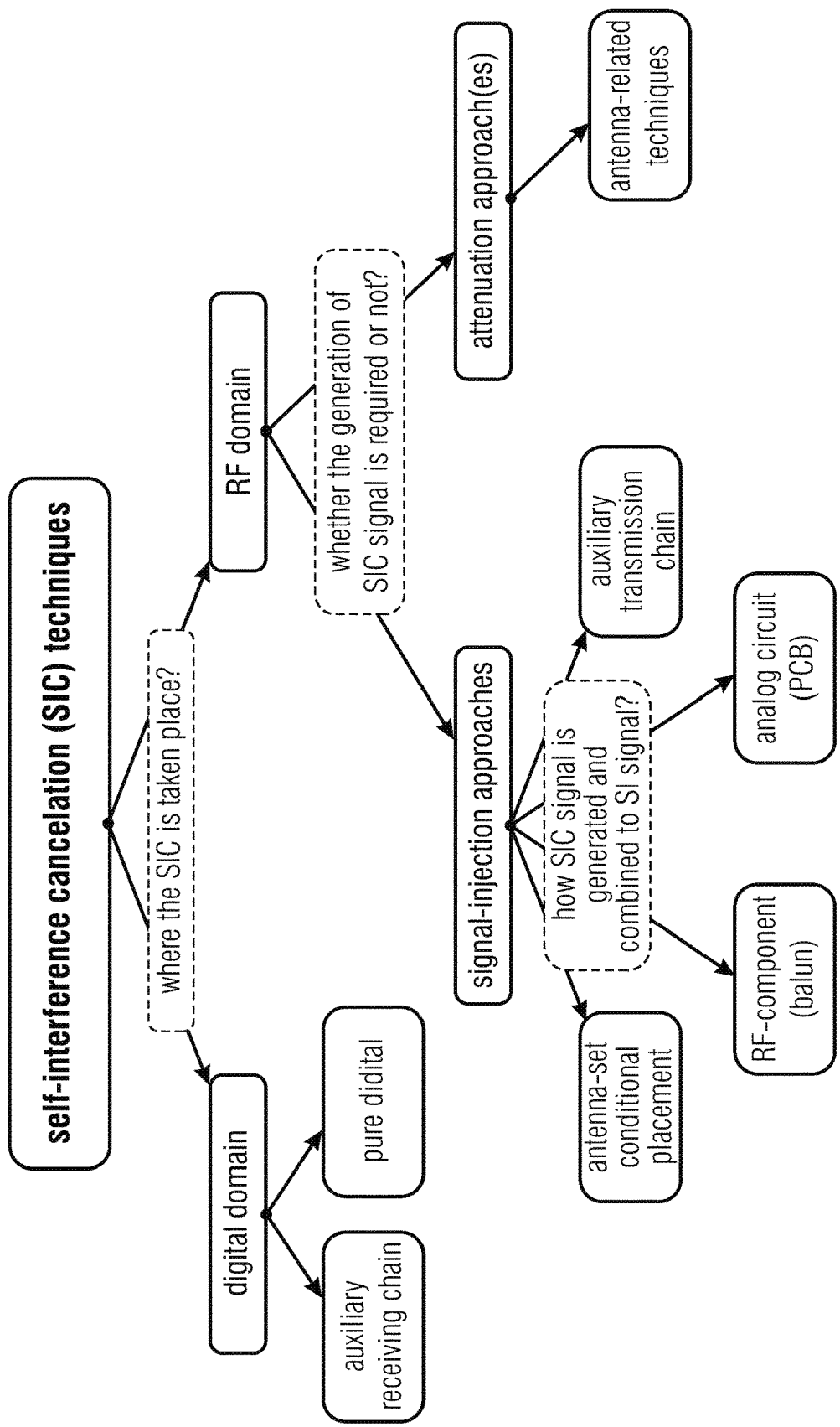
FIG. 9 shows a tree chart categorizing the self-interference cancellation techniques according to the conventional technology.

FIG. 8 shows a schematic diagram illustrating a first frequency band 1 and a second frequency band 2 spaced from each other in the frequency domain by a frequency gap 3. For example, in a FDD scheme, frequency band 1 may be used as an uplink channel, wherein frequency band 2 may be used as a downlink channel or vice versa. The frequency gap 3 may be used for separating both channels. Based on the teachings disclosed herein, the frequency gap may be reduced to zero. According to embodiments, the frequency bands 1 and 2 may overlap partially (Enhanced FDD mode) or completely (in-band full-duplex mode), while being accessed at the same time.

The above described transceivers may allow for reducing a frequency gap between transmission spectral ranges and reception spectral ranges (uplink and downlink) significantly. The reduction may extend to a level being less than the modulated bandwidth. For example, when considering LTE (Long Term Evolution) a modulated (used) bandwidth may be approximately 20 MHz. A frequency gap between uplink and downlink may be greater than 100 MHz and may be used for other purposes. When considering the so-called digital dividend, modulated bandwidths may be approximately 10 MHz and may be used for uplink or downlink. A frequency gap between frequency bands used for uplink and downlink may be approximately 12 MHz. The frequency gap may be reduced significantly, i.e., to less than or equal 100%, 70%, to less than 50%, to less than 10% or even to 0% when compared to a frequency range of a modulated bandwidth. The modulated bandwidth may refer to a frequency range of the uplink and/or downlink. The reduction may be performed without inserting relevant distortions in the neighboring band (uplink or downlink). In absolute values, when considering the digital dividend, the frequency gap may be reduced to at most 8.4 MHz, at most 6 MHz, at most 1.2 MHz or even to 0 MHz. This may allow for dropping a demand or requirement for separating spectral ranges of uplink and downlink. A separation may be performed, for example, using so-called diplex-filter. The diplex-filter may also be referred to as a duplex-filter and may allow for separating different wavelengths of a signal into a first and a second wavelength range. Embodiments described herein allow for transceivers configured to operate in the Enhanced FDD mode, wherein the transceivers do not comprise a diplex-filter or duplex-filter for separating (dividing) wavelengths of the received wireless receiving signal.

Suppression of out-of-band emissions of the uplink and the downlink using embodiments described herein may allow for not arranging filters configured for such purpose and/or for reducing the frequency gap 3.

Solid lines 82a and 82b may indicate a filter requirement for diplex-filter according to known concepts, i.e., a separation of frequency bands 1 and 2. Based on the self-interference cancellation, the requirements for the filters may be relaxed, as indicated by dashed line 84a and dashed/dotted line 84b. Thus, the diplex-filters, when arranged, may comprise flattened filter edges. This may allow for more simple filters. Alternatively, one or both of the filters may be not arranged. Alternatively or in addition, the frequency gap 3 may be reduced as explained above. Alternatively or in addition, the frequency bands 1 and 2 may overlap partially or completely so as to utilize an in-band full duplex operation.

The agile full-duplex transceiver architecture combined with the successive self-interference cancelation mechanism, unlike the up-to-date state-of-the-art techniques, offers a practical and compact solution to enable the full-duplex wireless transmission scheme. Embodiments provide successive (RF domain and digital domain) cancelation mechanism by concatenating a plurality of self-interference suppression technique. In conclusion, the invention is a fully operational agile full-duplex transceiver, which is capable of canceling the self-interference sufficiently, while the state-of-the-art techniques are not able to suppress the self-interference to the desired level.

The agile part of the transceiver is its capability of being tuned over frequency range (e.g. 100 Hz 6 GHz), and supporting couple of transmission scheme over the same architecture, i.e. the full-duplex one and conventional half-duplex systems, such as frequency division duplex (FDD). The support of the FDD duplexing scheme benefits from the self-interference cancelation methodology, which enhances its performance by suppressing the leakage form the transmitter (200) to the receiver (600) at the RF domain.

The digital down convertor (DDC) 805 may be a digital implementation of the superheterodyne receiver architecture. The DDC may down-convert received signal digitally to baseband as the LO signal of the feedback receiver (700) may only down-convert the signal around intermediate frequency (IF). The DDC 805 may be used to cope with direct-down-conversion introduced impairments, such as the I/Q imbalance, DC-offset and local oscillator (LO) feedthrough. The DDC 805 may be utilized here in the transceiver structure to provide more accurate estimation for some parameters that is useful for the PEUs, such as the I/Q imbalance for the transmission chains.

The DPDs 825 and/or 845 may deal with nonlinear models, unlike the PEUs 810 and/or 835 which may deal with linear models. All DPDs are optional, the nonlinear behavior of the transceiver components determines the need of having DPDs that correct (linearize) its nonlinear behavior or not. This nonlinear behavior usually starts to appear as the transmitting power increases, generated by the active components which the power amplifiers on top of it all, such as 270, 470 and/or 630.

The auxiliary pre-equalizer $PEU_{aux}$ 810 may be regarded as an essential element for enabling the hybrid suppresser 400 functionality. The hybrid suppresser 400 wouldn't be able to operate unless the $PEU_{aux}$ 810 has acquired its correct and up-to-date parameters. The acquisition of the parameters is done within an estimation phase before the activation of hybrid self-interference suppresser, as it is shown in the flowchart diagram of the successive self-interference cancelation mechanism in FIG. 7.

For example, a pilot based estimation procedure can be utilized in order to obtain the useful parameters for the $PEU_{aux}$ 810. A pilot signal may go through the main transmitter 200 and received via the ordinary receiver 600 first of all, then this pilot signal goes the auxiliary transmitter 400 and received via the ordinary receiver 600—the order of the two estimations could be changed. This received pilot is utilized by the $PAU_{ord}$ 860 to obtain a linear estimation of both the aforementioned chains. The $PAU_{ord}$ 860 afterwards constructs a linear pre-equalization model relying on earlier performed estimations. This constructed model is delivered by the $PAU_{ord}$ 860 to the $PEU_{aux}$ 810. The primary pre-equalizer $PEU_{prm}$ 835 can be used in parallel to its auxiliary counterpart 810. While in most of practical implementation the simple linear model of the $PEU_{aux}$ wouldn't be able to replicate the self-interference signal waveform completely due to some hardware impairments. The primary 835 and the auxiliary 810 pre-equalizers can be fed with some extra estimations done by the $PAU_{prm}$ 815 unit, which could improve their suppression performances, such as the I/Q imbalance parameters. In this case, the model of the auxiliary pre-equalizer $PEU_{aux}$ 810 may be extended and in parallel to the primary pre-equalizer 835 model.

The vector modulator 330 is capable of suppressing the self-interference signal in its multipath components form, which is usually found in practice as the primary transmitter 200 generated signal goes through wireless channel before it impinges on the ordinary receiver 600 antenna—in case of RF circulator, like in FIG. 3, it may be same antenna since one single antenna is used for transmission and reception.

The suppression of the self-interference signal at the RF domain may reach or exceed a certain value, in order to avoid saturating the ordinary receiver 600 front-end. Hence, the RF self-interference suppression amount is determined based on the transmission power of the primary transmission signal and the maximum power that the ordinary receiver 600 that can offered without saturating its components, i.e. most likely the LNA 630, or overwhelming the desired reception signal from the remote device. Overwhelming may be understood as the residual self-interference signal at the RF domain after the suppression may be at least in the same order of the desired reception signal. Thus, having a multipath suppression capability for the self-interference cancelation signal is desirable as more transmission power is useful or the selectivity of the self-interference radio channel is increased, most likely the wireless part, and accordingly more RF suppression is useful.

The estimations that are supposed to be performed earlier by means of the $PAU_{fb}$ 815 are delivered to the CCU 850 in order construct two I and Q baseband streams (control signals), which modify the RF self-interference cancelation signal that goes through the vector modulator 310.

The radio frequency (RF)-circulator 900 in FIG. 3 may be one way to realize the passive self-interference attenuation technique. It is relatively a compact device which may help to reduce the number of antennas to a one single antenna 120 for transmit and receive instead of having two dedicated antennas for transmit 120a and receive 120b as in FIG. 4 where the RF-circulator is not utilized. However, the passive suppression that the RF-circulator offers may be limited due to some technical reasons. For example, in practice the circulator ma suppress the self-interference signal by 20 dB approximately. Therefore, a two antenna configuration utilizes another passive self-interference techniques, such as physical separation, cross polarization, or/and placing an RF absorption materials between the transmit 120a and receive 120 b antennas. The two antenna configuration may be suitable where having an over-dimensioned transceiver is not a problem such as in mobile network base stations. To be more specific, the two antenna configuration may be recommended where the size of the wireless transceiver is not one of the design constrains, and more importantly where the two antenna configuration would be able to offer higher passive self-interference suppression than the configuration of single antenna with RF-circulator. This leaves the RF-circulator as plausible implementation method for the passive self-interference attenuation where the transceiver size matters.

Regarding the vector modulator 330 advantage, the vector modulator is one of the RF-filtration 300 implementation techniques, which is able to handle the multipath behavior of the self-interference wireless channel through a single RF link. A single RF link equipped with a vector modulator 330, which connects between the primary transmitter 200 and the ordinary receiver 600 in the RF domain as shown in FIG. 3 is able to suppress the self-interference signal in its multipath form as the channel estimation is provided to it the from the CCU 850 by means of two digital-to-analog converters (DACs).

Whilst, the other implementation method for the passive self-interference attenuation by means of the signal inverter 310 and the variable phase/delay and attenuation network 320 may be not capable of doing the same job, i.e. suppressing the multipath components of the self-interference radio channel, unless the number of the parallel links in the aforementioned network 320 exceeds one single link. However, the later implementation method—the signal inverter 310 followed by the variable phase/delay and attenuation network 320 may handle the multipath channel components and the non-deterministic disturbances that accompanies the self-interference signal as multiple of the parallel RF links are considered in the network 320 structure. Handling the non-deterministic disturbances is the advantage of this implementation method over the vector modulator, whereas the vector modulator is still a more compact and practical solution but not against the non-deterministic disturbances. Finally, the combination of both is also an option, as it is depicted in FIG. 3. This combination may allow for reducing the number of the useful parallel links in the variable phase/delay and attenuation network 320 in comparison to the case where the signal inverter 310 followed by the variable phase/delay and attenuation network 320 is solely implemented.

The tunability over a frequency range is one of the secondary (optional) features that an agile full-duplex transceiver according to embodiments offers. For example, a software defined radio (SDR) chip may enable a tunability of the local oscillator (LO)—795, 280 and/or 695, e.g., over a frequency range 70 MHz-6 GHz. This may allow the transceiver to operate over multiple frequencies—of course inside the defined range that the utilized hardware allowed— and supporting by that multiple wireless transmission schemes over wide and tunable frequency range, i.e. the primary targeted one which is the full-duplex and the conventional FDD and time division duplexing (TDD). Additionally, there is an enhancement done over the conventional FDD scheme in terms of the reducing the duplexing gap between the up- and downlink neighboring bands, and relaxing the RF filter design requirements that concerns the out-of-band attenuation value and steep roll-off factor.

In a short version, none of the state-of-the-art materials has introduced a tunable functionality for the full-duplex transceiver. Moreover, the state of the art discusses neither maintaining the support nor enhancing the conventional transmission scheme, such as FDD and TDD. In conclusion, the agility feature of the transceiver may be summarized by the tunability over a wide frequency range to support the full-duplex scheme in selected band and keep supporting the conventional duplexing schemes or even enhance them.

Some of the above described functionality may be suitable for adapting parameters of pre-equalization, pre-distortion, analog self-interference cancellation and/or a digital self-interference cancellation, during an active transmission phase of the transceivers 1000, 2000, 3000 and/or 4000, the feedback receiver 700 may be deactivated, i.e. the main receiver 600 may be used for receiving the signal from further transceiver, while the auxiliary transmitter 400 may be used for suppressing and/or canceling self-interference caused by the transceiver itself.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] D. Baharadia, E. McMilin, and S. Katti, "Full duplex radios," in *Proceedings of the ACM SIGCOMM 2013 conference on SIGCOMM*, ser. SIGCOMM '13. New York, N.Y., USA: ACM, 2013, pp. 375-386.
[2] D. Bharadia and S. Katti, "Full duplex mimo radios," in 11*th USENIX Symposium on Networked Systems Design and Implementation (NSDI* 14). Seattle, Wash.: USENIX Association, April 2014, pp. 359-372. [Online]. Available: https://www.usenix.orglconference/nsdi14/technical-sessions/bharadia
[3] O. Sarca, "Single channel full duplex wireless communication," Patent US 2014/00101423 A1, Jan. 9, 2014.
[4] O. Sarca, "Single channel full duplex wireless communication with enhanced baseband processing," Patent WO 20141097 267 A1, Jun. 26, 2014.
[5] E. Everett, M. Duarte, C. Dick, and A. Sabharwal, "Empowering full-duplex wireless communication by exploiting directional diversity," in *Signals, Systems and Computers (ASILOMAR),* 2011 *Conference Record of the Forty Fifth Asilomar Conference* on, November 2011, pp. 2002-2006.
[6] E. Everett, A. Sahai, and A. Sabharwal, "Passive self-interference suppression for full-duplex infrastructure nodes," *Wireless Communications, IEEE Transactions on,* vol. PP, no. 99. pp. 1-15, 2014.
[7] A. Sahai, G. Patel, and A. Sabharwal, "Pushing the limits of full-duplex: Design and real-time implementation," Rice University, Technical report, July 2011.
[8] J. I. Choi, M. Jain, K. Srinivasan, P. *Levis,* and S. Katti, "Achieving single channel, full duplex wireless communication," in *Proceedings of the sixteenth annual international conference on Mobile computing and networking,* ser. MobiCom '10. New York, N.Y., USA: ACM, 2010, pp. 1-12.
[9] J. Mayank, C. Jung, S. Kannan, L. Philip, K. Sachin, and 5. Siddharth, "single channel full duplex wireless communications," Patent WO 2012/106263 A1, Aug. 9, 2012.
[10] M. A. Khojastepour K. Sundaresan, S. Rangarajan, X. Zhang, and S. Barghi, "The case for antenna cancellation for scalable full-duplex wireless communications," in *Proceedings of the '10th ACM Workshop on Hot Topics in Networks,* ser. HotNets-X. New York, N.Y. USA: ACM, 2011, pp. 17:1-17:6.
[11] M. Jain, J. I. Choi, T. Kim, D. Bharadia, S. Seth, K. Srinivasan, P. *Levis,* S. Katti, and P. Sinha, "Practical, real-time, full duplex wireless," in Proceedings of the 17th annual international conference on Mobile computing and networking, ser. MobiCom '11. New York, N.Y. USA: ACM, 2011, pp. 301-312.
[12] M. Duarte and A. Sabharwal, "Full-duplex wireless communications using off-the-shelf radios: Feasibility and first results," in *Signals, Systems and Computers (ASILOMAR),* 2010 *Conference Record of the Forty Fourth Asilomar Conference* on, 2010, pp. 1558-1562.
[13] M. Duarte, C. Dick, and A. Sabharwal, "Experiment-driven characterization of full-duplex wireless systems," *Wireless Communications, IEEE Transactions* on, vol. 1 1, no. 12, pp. 4296-4307, December 2012.
[14] R. Askar, N. Zarifeh, B. Schubert, W. Keusgen, and T. Kaiser, "I/Q imbalance calibration for higher self-interference cancellation levels in full-duplex wireless transceivers," in 5G *for ubiquitous Connectivity (5GU),* 2014 1st *International Conference* on, November 2014, pp. 92-97.
[15] R. Askal T. Kaiser, B. Schubert, T. Haustein, and W. Keusgen, "Active self-interference cancellation mechanism for full-duplex wireless transceivers," in *Cognitive Radio Oriented Wireless Networks and Communications (CRO WNCOM),* 2014 9*th International Conference* on, June 2014, pp. 539-544.
[16] A. Sahai, G. Patel, C. Dick, and A. Sabharwal, "On the impact of phase noise on active cancellation in wireless full-duplex" *Vehicular Technology, IEEE Transactions* on, vol. 62, no. 9, pp. 4494-4510, November 2013.
[17] V. Syrjala, M. Valkama, L. Anttila, T. Riihonen, and D. Korpi, "Analysis of oscillator phase-noise effects on self-interference cancellation in full-duplex ofdm radio transceivers," *Wireless Communications, IEEE Transactions* on, vol. 13, no. 6, pp. 2977-2990, June 2014.
[18] Y. Hua, Y. Ma, P. Liang, and A. Cirik, "Breaking the barrier of transmission noise in full-duplex radio," in *Military Communications Conference, MILCOM* 2013-2013 *IEEE,* November 2013, pp. 1558-1 563.
[19] D. Bharadia, K. R. Joshi, and 5. Katti, "Full duplex backscatter" in Proceedings of the Twelfth ACM Workshop on HotTopics in Networks, ser. HotNets-XII. New York, N.Y., USA: ACM, 2013, pp. 4:1-4:7.
[20] B. Radunovic, D. Gunawardena, P. Key, and V. B. G. D. Alexandre Proutiere, Nikhil Singh, "Rethinking indoor wireless: Low powe4 low frequency, full-duplex," Microsoft Research, Technical report MSR-TR-2009-148, 2009.
[21] Kim, J. & Konstantinou, K., "Digital predistortion of wideband signals based on power amplifier model with memory", Electronics Letters, 2001, 37, 1417-1418.
[22] Zhu, A. & Brazil, T., "An Overview of Volterra Series Based Behavioral Modeling of RF/Microwave Power Amplifiers", Wireless and Microwave Technology Conference, 2006. WAMICON '06. IEEE Annual, 2006, 1-5.

The invention claimed is:

1. A transceiver comprising:
an antenna arrangement configured for interfacing a wireless transmission channel and comprising an interface for receiving a sending signal and an interface for providing a receiving signal;
a main transmitter connected to the antenna arrangement and configured for generating the sending signal based on a digital transmission signal;
an analog domain filter configured for generating a first interference cancellation signal from the sending signal;
an auxiliary transmitter configured for generating a second interference cancellation signal based on a digital auxiliary signal;
a radio frequency interference removal stage for performing interference cancellation on the receiving signal using the first interference cancellation signal and the second interference cancellation signal to acquire a preliminary enhanced signal;
a main receiver configured for receiving the preliminary enhanced signal and for providing a digital receiving signal;
a feedback receiver configured for providing a feedback signal based on the preliminary enhanced signal at a first operating mode and based on the sending signal at a second operating mode; and
a processor configured for receiving the digital receiving signal, for receiving the feedback signal, for providing the digital transmission signal based on an input information signal and for providing the digital auxiliary signal based on the input information signal;
wherein the processor comprises a linear pre-equalizer configured for pre-equalizing the digital auxiliary signal based on the digital receiving signal;
wherein the processor comprises a digital self-interference canceller configured for determining a digital interference cancellation signal based on the input signal and based on the digital receiving signal;
wherein the processor comprises a digital interference removal stage configured for performing digital interference cancellation on the digital receiving signal using the digital interference cancellation signal to acquire an enhanced receiving signal; and wherein the processor is configured for parametrizing the analog domain filter based on an evaluation of the feedback signal received from the feedback receiver in the first operating mode and in the second operating mode and for parametrizing the linear pre-equalizer based on the digital receiving signal.

2. The transceiver according to claim 1, wherein the feedback receiver comprises a multiplexer configured for receiving the preliminary enhanced signal and the sending signal and for providing the preliminary enhanced signal at an output of the multiplexer when being in the first operating mode and for providing the sending signal at the output when being in the second operating mode.

3. The transceiver according to claim 1, wherein the processor is configured for determining a measure relating to the digital interference cancellation signal being deterministic, to control the digital self-interference canceller so as to determine the digital interference cancellation signal based on the input signal and based on the digital receiving signal when the measure is above a threshold value or equal to the threshold value, and to control the digital self-interference canceller so as to determine the digital interference cancellation signal based on the feedback signal and based on the digital receiving signal when the measure is below a threshold value.

4. The transceiver according claim 3, wherein the processor is configured for determining the measure relating to the digital interference cancellation signal being deterministic based on a correlation of the input signal and the digital receiving signal.

5. The transceiver according to claim 1, wherein, during a first time interval, the processor is configured to provide the digital transmission signal to the main transmitter and to control the feedback receiver such that the feedback receiver operates in the first operating mode, wherein the processor is configured for determining a parameter of the linear pre-equalizer and for parametrizing the analog domain filter based on the feedback signal; and wherein, during a second time interval, the processor is configured to provide the digital auxiliary signal to the auxiliary transmitter and to control the feedback receiver such that the feedback receiver operates in the second operating mode, wherein the processor comprises a further linear pre-equalizer configured for pre-equalizing the digital transmission signal based on the digital feedback signal.

6. The transceiver according to claim 1, wherein the processor is configured for parametrizing the analog domain filter based on the feedback signal.

7. The transceiver according to claim 1, wherein the feedback receiver is configured for providing the feedback signal based on the second interference cancellation signal at a third operating mode; wherein the processor is configured for pre-equalizing the digital transmission signal based on the feedback signal.

8. The transceiver according to claim 1, wherein the feedback receiver comprises a radio frequency multiplexer configured for receiving the preliminary enhanced signal and the sending signal and to provide the preliminary enhanced signal while not providing the sending signal during the first operating mode of the feedback receiver and for providing the sending signal while not providing the preliminary enhanced signal during the second operating mode of the feedback receiver.

9. The transceiver according to claim 1, wherein the processor comprises a further linear pre-equalizer configured for pre-equalizing the digital auxiliary signal based on the digital receiving signal or based on the feedback signal.

10. The transceiver according to claim 1, wherein the processor is configured for using the feedback receiver for determining a parameter of the analog domain filter and for deactivating the feedback receiver during an active transmission phase between the transceiver and a further transceiver.

11. The transceiver according to claim 1, wherein the analog domain filter is configured for generating the first interference cancellation signal based on a signal inversion, based on an attenuation and based on a phase manipulation, wherein the processor is configured for adapting a parameter of the attenuation or of the phase manipulation.

12. The transceiver according to claim 11, wherein the analog domain filter comprises an attenuation network configured for attenuating a received signal and a delay network configured for delaying a received signal for acquiring the phase manipulation or a phase shifter for phase shifting a received signal for acquiring the phase manipulation.

13. The transceiver according to claim 1, wherein the processor is configured for adjusting a down-conversion frequency of the main receiver or of the feedback receiver or for adjusting an up-conversion frequency of the main transmitter or of the auxiliary transmitter so as to adjust a frequency band of the transceiver used for transmitting and/or sending.

14. The transceiver according to claim 1, wherein the antenna arrangement comprises an antenna element for transmitting the sending signal to the wireless transmission channel and for receiving the receiving signal from the wireless transmission channel or wherein the antenna arrangement comprises a first antenna element configured for transmitting the sending signal to the wireless transmission channel and comprises a second antenna element configured for receiving the receiving signal from the wireless transmission channel.

15. The transceiver according to claim 14, wherein the antenna arrangement comprises the first antenna element configured for transmitting the sending signal to the wireless transmission channel with a first polarization and comprises the second antenna element configured for receiving the receiving signal from the wireless transmission channel with a second polarization, wherein the first and second polarizations are different from each other.

16. The transceiver according to claim 1, wherein the processor is further configured for parametrizing the linear pre-equalizer based on the feedback signal.

17. The transceiver according to claim 1, wherein the processor comprises a non-linear pre-distorter configured for pre-distorting the digital transmission signal or the digital auxiliary signal based on the feedback signal.

18. The transceiver according to claim 1, wherein a down-converter of the feedback receiver is configured for operating at a lower down-conversion frequency when compared to a down-converter of the main transceiver.

19. The transceiver according to claim 1, wherein the main receiver comprises a first digital down-converter configured for providing a first portion of a first down-converted signal at a first output, the first portion comprising an imaginary portion of the receiving signal, and for providing a second portion of the first down-converted signal at a second output, the second portion comprising a real portion of the receiving signal, wherein the feedback receiver comprises a second down-converter configured for providing the second down-converted signal comprising an imaginary portion and a real portion, wherein the processor comprises a digital down-converter for acquiring an imaginary portion of the feedback signal and for acquiring a real portion of the feedback signal.

20. The transceiver according to claim 1, further comprising a passive attenuation element arranged between the main transmitter and the main receiver, the attenuation element configured for attenuating an interfering influence of the sending signal to the receiving signal.

21. The transceiver according to claim 20, wherein the attenuation element comprises an radio frequency circulator configured for interconnecting the antenna arrangement and the main transmitter and for interconnecting the antenna arrangement and the main receiver.

22. The transceiver according to claim 1, wherein the transceiver is configured for operating in an in-band full-duplex mode.

23. The transceiver according to claim 22, wherein the transceiver is configured for operating in the in-band full-duplex mode during a third time interval and for operating during a fourth time interval in a frequency division duplex mode while performing radio frequency self-interference cancellation and digital self-interference cancellation or in a time division duplex mode while performing radio frequency self-interference cancellation and digital self-interference cancellation.

24. The transceiver according to claim 23, wherein the transceiver is configured for operating in the frequency division duplex mode during the fourth time interval, wherein a frequency gap between a transmission spectral range and a reception spectral range is less than or equal a frequency range of a modulated bandwidth.

25. The transceiver according to claim 22, wherein the processor is configured for adjusting a radio frequency self-interference cancellation and a digital self-interference cancellation during a calibration phase and for operating in the in-band full-duplex mode during an active transmission phase between the transceiver and a further transceiver.

26. The transceiver according to claim 1, wherein the transceiver comprises no diplex-filter or duplex filter for separating wavelengths of a wireless sending signal transmitted by the antenna arrangement and a received wireless signal received with the antenna arrangement.

27. A system comprising:
a transceiver according to claim 1; and
a data source for providing the input signal.

28. The system according to claim 27, wherein the system is one of a mobile communication device, a fixed wireless communication device, a nomadic communication device and a portable communication device.

29. A method for reducing a self-interference of a transmitter, the method comprising:
interfacing a wireless transmission channel with an antenna arrangement;
generating a sending signal based on a digital transmission signal using a main transmitter;
generating a first interference cancellation signal from the sending signal using an analog domain filter;
generating a second interference cancellation signal based on a digital auxiliary signal using an auxiliary transmitter;
performing, using an interference removal stage, radio frequency interference cancellation on the receiving signal using the first interference cancellation signal and the second interference cancellation signal to acquire a preliminary enhanced signal;
receiving the preliminary enhanced signal and providing a digital receiving signal using a main receiver;
providing a feedback signal based on the preliminary enhanced signal at a first operating mode and based on the sending signal at a second operating mode using a feedback receiver;
receiving the feedback signal, providing the digital transmission signal based on an input information signal and providing the digital auxiliary signal based on the input information signal using a processor; and
pre-equalizing the digital auxiliary signal based on the digital receiving signal using a linear pre-equalizer;
determining a digital interference cancellation signal based on the input signal and based on the digital receiving signal using a digital self-interference canceller of the processor;
performing digital interference cancellation on the digital receiving signal using the digital interference cancellation signal and using a digital interference removal stage of the processor to acquire an enhanced receiving signal;
parametrizing the analog domain filter based on an evaluation of the feedback signal received from the feedback receiver in the first operating mode and in the second operating mode and parametrizing the linear pre-equalizer based on the digital receiving signal using the processor.

30. The method according to claim 29, wherein generating the first interference cancellation signal from the sending signal using the analog domain filter comprises providing the sending signal to the analog domain filter and adapting a parameter of the attenuation network based on an interference of the sending signal determined at the temporarily enhanced signal.

31. The method according to claim 29, further comprising:
evaluating if the self-interference characteristic is essentially deterministic, using the processor; and
determining the digital interference cancellation signal based on the input signal and based on the digital receiving signal when the self-interference characteristic is essentially deterministic or based on the feedback signal and based on the digital receiving signal when the self-interference characteristic is not essentially deterministic.

32. A non-transitory digital storage medium having a computer program stored thereon to perform the method for reducing a self-interference of a transmitter, the method comprising:
interfacing a wireless transmission channel with an antenna arrangement;
generating a sending signal based on a digital transmission signal using a main transmitter;
generating a first interference cancellation signal from the sending signal using an analog domain filter;
generating a second interference cancellation signal based on a digital auxiliary signal using an auxiliary transmitter;
performing, using an interference removal stage, radio frequency interference cancellation on the receiving signal using the first interference cancellation signal and the second interference cancellation signal to acquire a preliminary enhanced signal;
receiving the preliminary enhanced signal and providing a digital receiving signal using a main receiver;

providing a feedback signal based on the preliminary enhanced signal at a first operating mode and based on the sending signal at a second operating mode using a feedback receiver;
receiving the feedback signal, providing the digital transmission signal based on an input information signal and providing the digital auxiliary signal based on the input information signal using a processor; and
pre-equalizing the digital auxiliary signal based on the digital receiving signal using a linear pre-equalizer;
determining a digital interference cancellation signal based on the input signal and based on the digital receiving signal using a digital self-interference canceller of the processor;
performing digital interference cancellation on the digital receiving signal using the digital interference cancellation signal and using a digital interference removal stage of the processor to acquire an enhanced receiving signal;
parametrizing the analog domain filter based on an evaluation of the feedback signal received from the feedback receiver in the first operating mode and in the second operating mode and parametrizing the linear pre-equalizer based on the digital receiving signal using the processor,
when said computer program is run by a computer.

* * * * *